US012811735B2

United States Patent

Mukherjee et al.

(10) Patent No.: US 12,811,735 B2
(45) Date of Patent: Nov. 24, 2026

(54) APPARATUS AND METHODS FOR MULTI-CELL RANDOM ACCESS CHANNEL

(71) Applicant: CHARTER COMMUNICATIONS OPERATING, LLC, St. Louis, MO (US)

(72) Inventors: Amitav Mukherjee, Elk Grove, CA (US); Maulik Vaidya, Escondido, CA (US); Ahmad Reza Hedayat, Carlsbad, CA (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

(21) Appl. No.: 18/135,015

(22) Filed: Apr. 14, 2023

(65) Prior Publication Data

US 2023/0254903 A1 Aug. 10, 2023

Related U.S. Application Data

(63) Continuation of application No. 17/116,853, filed on Dec. 9, 2020, now Pat. No. 11,632,804.

(60) Provisional application No. 62/945,786, filed on Dec. 9, 2019.

(51) Int. Cl.
*H04W 74/0833* (2024.01)
*H04L 5/00* (2006.01)
*H04W 74/0836* (2024.01)

(52) U.S. Cl.
CPC ....... *H04L 5/0048* (2013.01); *H04W 74/0833* (2013.01); *H04W 74/0836* (2024.01)

(58) Field of Classification Search
CPC .. H04W 74/0833; H04W 16/14; H04L 5/0048
(Continued)

(56) References Cited

U.S. PATENT DOCUMENTS

| | | | | |
|---|---|---|---|---|
| 10,420,033 | B2 * | 9/2019 | Dinan | H04W 52/14 |
| 11,323,321 | B2 | 5/2022 | Wager et al. | |

(Continued)

FOREIGN PATENT DOCUMENTS

| | | | |
|---|---|---|---|
| EP | 3439221 | A1 | 2/2019 |

OTHER PUBLICATIONS

Rajat Ghai (CBRS Use-Cases With focus on Localized Indoor Mobile Access (LIMA), Mobility and Service Continuity, fall 2018). (Year: 2018).*

(Continued)

*Primary Examiner* — Maharishi V Khirodhar
(74) *Attorney, Agent, or Firm* — Patent Beach PC

(57) ABSTRACT

Apparatus and methods for multi-cell broadcast access channel utilization in a wireless network. In one embodiment, the apparatus and methods provide random access channel (RACH) procedure for a 3GPP-compliant user device (e.g., an enhanced UE or UEe) which attempts to connect to multiple cells simultaneously. In one variant, the UEe employs a multi-step (e.g., 4-step) RACH procedure to connect to the multiple cells. This significantly increases the likelihood of RACH procedure success and UEe access. In another variant, a 2-step RACH process is utilized. Variants of the apparatus and methods utilizing unlicensed spectrum and LBT (listen-before-talk) protocols are also described.

24 Claims, 18 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 11,357,041 | B2 | 6/2022 | Zhang et al. | |
| 11,632,804 | B2 * | 4/2023 | Mukherjee | H04L 5/0048 370/329 |
| 2013/0188620 | A1 | 7/2013 | Dinan | |
| 2014/0098763 | A1 * | 4/2014 | Hakola | H04W 72/0466 370/329 |
| 2016/0112946 | A1 * | 4/2016 | Yi | H04W 48/20 370/280 |
| 2016/0227581 | A1 | 8/2016 | Lee et al. | |
| 2016/0353474 | A1 * | 12/2016 | Zhang | H04W 72/1273 |
| 2016/0360567 | A1 | 12/2016 | Wu | |
| 2017/0164408 | A1 | 6/2017 | Takeda et al. | |
| 2018/0063801 | A1 | 3/2018 | Lu et al. | |
| 2018/0235013 | A1 * | 8/2018 | Jung | H04W 74/006 |
| 2018/0279358 | A1 * | 9/2018 | Babaei | H04W 72/0453 |
| 2018/0367374 | A1 * | 12/2018 | Liu | H04L 5/0051 |
| 2019/0215869 | A1 * | 7/2019 | Lin | H04W 74/02 |
| 2019/0320467 | A1 * | 10/2019 | Freda | H04L 5/0055 |
| 2020/0100294 | A1 * | 3/2020 | Chen | H04W 74/0833 |
| 2020/0137779 | A1 | 4/2020 | Sun et al. | |
| 2020/0137806 | A1 * | 4/2020 | Islam | H04L 27/2607 |
| 2020/0186304 | A1 * | 6/2020 | Khoshnevisan | H04W 76/15 |
| 2020/0305038 | A1 | 9/2020 | Tooher et al. | |
| 2021/0160923 | A1 * | 5/2021 | Zhang | H04W 74/0833 |

OTHER PUBLICATIONS

3GPP ETSI TS 136 212 V15.2.1 (Jul. 2018), LTE, Evolved Universal Terrestrial Radio Access (E-UTRA), Multiplexing and channel coding (3GPP TS 36.212 version 15.2.1 Release 15), 250 pages.

3GPP ETSI TS 138 321 V15.3.0 (Sep. 2018), 5G; NR; Medium Access Control (MAC) protocol specification (3GPP TS 38.321 version 15.3.0 Release 15), 77 pages.

3GPP TR 36.808 3rd Generation Partnership Project; Technical Specification Group Radio Access Network; Evolved Universal Terrestrial Radio Access Network (E-UTRAN); Carrier Aggregation (Release 10) dated Aug. 2010.

3GPP TS 136 331 V16.1.1 (Jul. 2020), LTE; Evolved Universal Terrestrial Radio Access (E-UTRA); Radio Resource Control (RRC); Protocol specification (3GPP TS 36.331 version 16.1.1 Release 16), 1083 pages.

3GPP TS 38.213 V15.6.0 (Jun. 2019) entitled Technical Report—3rd Generation Partnership Project; Technical Specification Group Radio Access Network; NR; Physical Layer Procedure for Control (Release 15), 110 pages.

3GPP TS 38.413 3rd Generation Partnership Project; Technical Specification Group Radio Access Network; NG-RAN; NG Application Protocol (NGAP) (Release 16), (Dec. 2019) 335 pages.

3GPP TSG-RAN WG2 #98-AH, "Multiple Preamble Transmissions in NR Random Access," Ericsson, R2-1707131, Qingdao, P.R. of China, Jun. 27-29, 2017.

5G; NR; Multiplexing and Channel Coding 3GPP TS 38.212 version 15.2.0 Release 15.

Article 5 of the Radio Regulations (edition 2001), Introduction to International Radio Regulations, 161 pages.

Federal Communications Commission, Table of Frequency Allocations as codified at Section 2.106, 2014, 141 pages.

Ghai R., "C8RS Use-Cases With focus on Localized Indoor Mobile Access (LIMA), Mobility and Service Continuity," Fall Technical Forum, 2018, 36 pages.

Nokia 5G New Radio (NR): Physical Layer Overview and Performance, IEEE Communication Theory Workshop, 2018 by A. Ghosh, May 15, 2018, 38 pages.

TS 38.331 V15.6.0 "NR; Radio Resource Control (RRC); Protocol specification" dated Jun. 2019.

* cited by examiner

FIG. 4A (Prior art)

| IE *RACH-ConfigCommon* | |
|---|---|
| *messagePoweOffserGroupB* | Threshold for preamble selection. Value is in dB. Value *minusinfinity* corresponds to –infinity. Value *dB0* corresponds to 0 dB, *dB5* corresponds to 5 dB and so on |
| *msg1-SubcarrierSpacing* | Subcarrier spacing of PRACH. Only the values 15 or 30 kHz (FR1), and 60 or 120 kHz (FR2) are applicable. If absent, the UE applies the SCS as derived from the *prach-ConfigurationIndex* in *RACH-ConfigGeneric* |
| *msg3-transformPrecoder* | Enables the transform precoder for Msg3 transmission. If the field is absent, the UE disables the transformer precoder |
| *numberOfRA-PreamblesGroupA* | The number of CB preambles per SSB in group A. This determines implicitly the number of CB preambles per SSB available in group B. The setting should be consistent with the setting of *ssb-perRACH-OccasionAndCB-PreamblesPerSSB.* |
| *prach-RootSequenceIndex* | PRACH root sequence index. The short/long preamble format indicated in this IE should be consistent with the one indicated *in prach-ConfigurationIndex* in *the RACH-ConfigDedicated* (if configured). |
| *ra-ContentionResolutionTimer* | The initial value for the contention resolution timer. Value sf8 corresponds to 8 subframes, value sf16 corresponds to 16 subframes, and so on. |
| *ra-Msg3SizeGroupA* | The number of CB preambles per SSB in group A. This determines implicitly the number of CB preambles per SSB available in group B. The setting should be consistent with the setting of *ssb-perRACH-OccasionAndCB-PreamblesPerSSB.* |
| *rach-ConfigGeneric* | RACH parameters for both regular random access and beam failure recovery. |
| *restrictedSetConfig* | Configuration of an unrestricted set or one of two types of restricted |
| *rsrp-ThresholdSSB* | UE may select the SS block and corresponding PRACH resource for path-loss estimation and (re)transmission based on SS blocks that satisfy the threshold . |
| *rsrp-ThresholdSSB-SUL* | The UE selects SUL carrier to perform random access based on this threshold. The value applies to all the BWPs |
| *ssb-perRACH-OccasionAndCB-PreamblesPerSSB* | The meaning of this field is twofold: the CHOICE conveys the information about the number of SSBs per RACH occasion. |
| *totalNumberOfRA-Preambles* | Total number of preambles used for contention based and contention free random access in the RACH resources defined in *RACH-ConfigCommon*, excluding preambles used for other purposes (e.g. for SI request). If the field is absent, all 64 preambles are available for RA. The setting should be consistent with the setting *of ssb-perRACH-OccasionAndCB-PreamblesPerSSB*, i.e. it should be a multiple of the number of SSBs per RACH occasion |
| *L139* | The field is mandatory present if *prach-RootSequenceIndex* L=139, otherwise the field is absent. |
| *SUL* | The field is mandatory present in *initialUplinkBWP* in *supplementaryUplink*, otherwise, the field is absent |
| *SSB-to-RO* | |

FIG. 4B (Prior art)

| *IE RACH-ConfigGeneric* | |
|---|---|
| *msg1-FDM* | The number of PRACH transmission occasions FDMed in one time instance. |
| *msg1-FrequencyStart* | Offset of lowest PRACH transmission occasion in frequency domain with respective to PRB 0. The value is configured so that the corresponding RACH resource is entirely within the bandwidth of the UL BWP |
| *powerRampingStep* | Power ramping steps for PRACH |
| *prach-ConfigurationIndex* | PRACH configuration index. For *prach-ConfigurationIndex* configured under *beamFailureRecovery-Config*, the *prach-ConfigurationIndex* can only correspond to the short preamble format |
| *preambleReceivedTargetPower* | The target power level at the network receiver side |
| *preambleTransMax* | Max number of RA preamble transmission performed before declaring a failure. |
| *ra-ResponseWindow* | Msg2 (RAR) window length in number of slots. The network configures a value lower than or equal to 10 ms. UE ignores the field if included in *SCellConfig*. |
| *zeroCorrelationZoneConfig* | N-CS configuration |
| | |

FIG. 5A

| IE *RACH-ConfigCommon* | |
|---|---|
| *messagePoweOffserGroupB* | Threshold for preamble selection. Value is in dB. Value *minusinfinity* corresponds to –infinity. Value *dB0* corresponds to 0 dB, *dB5* corresponds to 5 dB and so on |
| *sg1-SubcarrierSpacing* | Subcarrier spacing of PRACH. Only the values 15 or 30 kHz (FR1), and 60 or 120 kHz (FR2) are applicable. If absent, the UE applies the SCS as derived from the *prach-ConfigurationIndex* in *RACH-ConfigGeneric* |
| *msg3-transformPrecoder* | Enables the transform precoder for Msg3 transmission. If the field is absent, the UE disables the transformer precoder |
| *numberOfRA-PreamblesGroupA* | The number of CB preambles per SSB in group A. This determines implicitly the number of CB preambles per SSB available in group B. The setting should be consistent with the setting of *ssb-perRACH-OccasionAndCB-PreamblesPerSSB.* |
| *prach-RootSequenceIndex* | PRACH root sequence index. The short/long preamble format indicated in this IE should be consistent with the one indicated *in prach-ConfigurationIndex* in *the RACH-ConfigDedicated* (if configured). |
| *ra-ContentionResolutionTimer* | The initial value for the contention resolution timer. Value sf8 corresponds to 8 subframes, value sf16 corresponds to 16 subframes, and so on. |
| *ra-Msg3SizeGroupA* | The number of CB preambles per SSB in group A. This determines implicitly the number of CB preambles per SSB available in group B. The setting should be consistent with the setting of *ssb-perRACH-OccasionAndCB-PreamblesPerSSB.* |
| *rach-ConfigGeneric* | RACH parameters for both regular random access and beam failure recovery. |
| *restrictedSetConfig* | Configuration of an unrestricted set or one of two types of restricted |
| *rsrp-ThresholdSSB* | UE may select the SS block and corresponding PRACH resource for path-loss estimation and (re)transmission based on SS blocks that satisfy the threshold . |
| *rsrp-ThresholdSSB-SUL* | The UE selects SUL carrier to perform random access based on this threshold. The value applies to all the BWPs |
| *ssb-perRACH-OccasionAndCB-PreamblesPerSSB* | The meaning of this field is twofold: the CHOICE conveys the information about the number of SSBs per RACH occasion. |
| *totalNumberOfRA-Preambles* | Total number of preambles used for contention based and contention free random access in the RACH resources defined in *RACH-ConfigCommon*, excluding preambles used for other purposes (e.g. for SI request). If the field is absent, all 64 preambles are available for RA. The setting should be consistent with the setting *of ssb-perRACH-OccasionAndCB-PreamblesPerSSB*, i.e. it should be a multiple of the number of SSBs per RACH occasion |
| *L139* | The field is mandatory present if *prach-RootSequenceIndex* L=139, otherwise the field is absent. |
| *SUL* | The field is mandatory present in *initialUplinkBWP* in *supplementaryUplink*; otherwise, the field is absent |
| *SSB-to-multi-cell-RO* | |

FIG. 5B

| *IE RACH-ConfigGeneric* | |
|---|---|
| *msg1-FDM* | The number of PRACH transmission occasions FDMed in one time instance. |
| *msg1-FrequencyStart* | Offset of lowest PRACH transmission occasion in frequency domain with respective to PRB 0. The value is configured so that the corresponding RACH resource is entirely within the bandwidth of the UL BWP |
| *powerRampingStep* | Power ramping steps for PRACH |
| *prach-ConfigurationIndexA* | PRACH configuration index. For *prach-ConfigurationIndex* configured under *beamFailureRecovery-Config*, the *prach-ConfigurationIndex* can only correspond to the short preamble format |
| *prach-ConfigurationIndexB* | PRACH configuration index. For *prach-ConfigurationIndex* configured under *beamFailureRecovery-Config*, the *prach-ConfigurationIndex* can only correspond to the short preamble format |
| *prach-ConfigurationIndexC* | PRACH configuration index. For *prach-ConfigurationIndex* configured under *beamFailureRecovery-Config*, the *prach-ConfigurationIndex* can only correspond to the short preamble format |
| *prach-ConfigurationIndexD* | PRACH configuration index. For *prach-ConfigurationIndex* configured under *beamFailureRecovery-Config*, the *prach-ConfigurationIndex* can only correspond to the short preamble formatIE |
| *preambleReceivedTargetPower* | The target power level at the network receiver side |
| *preambleTransMax* | Max number of RA preamble transmission performed before declaring a failure. |
| *ra-ResponseWindow* | Msg2 (RAR) window length in number of slots. The network configures a value lower than or equal to 10 ms. UE ignores the field if included in *SCellConfig*. |
| *zeroCorrelationZoneConfig* | N-CS configuration |

APPARATUS AND METHODS FOR MULTI-CELL RANDOM ACCESS CHANNEL

PRIORITY

This application is a continuation of, and claims priority to, co-owned and U.S. patent application Ser. No. 17/116,853 of the same title filed on Dec. 9, 2020, and issuing as U.S. Pat. No. 11,632,804 on Apr. 18, 2023, which claims priority to co-owned U.S. Provisional Patent Application Ser. No. 62/945,786 entitled "APPARATUS AND METHODS FOR MULTI-CELL RANDOM ACCESS CHANNEL" filed Dec. 9, 2019, each of which are incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of wireless devices and networks thereof, and specifically in one exemplary aspect provides multi-cell random access mechanisms for a radio network.

2. Description of Related Technology

A multitude of wireless networking technologies, also known as Radio Access Technologies ("RATs"), provide the underlying means of connection for radio-based communication networks to user devices. Such RATs often utilize licensed radio frequency spectrum (i.e., that allocated by the FCC per the Table of Frequency Allocations as codified at Section 2.106 of the Commission's Rules). Currently only frequency bands between 9 kHz and 275 GHz have been allocated (i.e., designated for use by one or more terrestrial or space radio communication services or the radio astronomy service under specified conditions). For example, a typical cellular service provider might utilize spectrum for so-called "3G" (third generation) and "4G" (fourth generation) wireless communications as shown in Table 1 below:

TABLE 1

| Technology | Bands |
|---|---|
| 3G | 850 MHz Cellular, Band 5 (GSM/GPRS/EDGE).<br>1900 MHz PCS, Band 2 (GSM/GPRS/EDGE).<br>850 MHz Cellular, Band 5 (UMTS/HSPA+ up to 21 Mbit/s).<br>1900 MHz PCS, Band 2 (UMTS/HSPA+ up to 21 Mbit/s). |
| 4G | 700 MHz Lower B/C, Band 12/17 (LTE).<br>850 MHz Cellular, Band 5 (LTE).<br>1700/2100 MHz AWS, Band 4 (LTE).<br>1900 MHz PCS, Band 2 (LTE).<br>2300 MHz WCS, Band 30 (LTE). |

Alternatively, unlicensed spectrum may be utilized, such as that within the so-called ISM-bands. The ISM bands are defined by the ITU Radio Regulations (Article 5) in footnotes 5.138, 5.150, and 5.280 of the Radio Regulations. In the United States, uses of the ISM bands are governed by Part 18 of the Federal Communications Commission (FCC) rules, while Part 15 contains the rules for unlicensed communication devices, even those that share ISM frequencies. Table 2 below shows typical ISM frequency allocations:

TABLE 2

| Frequency range | Type | Center frequency | Availability | Licensed users |
|---|---|---|---|---|
| 6.765 MHz-6.795 MHz | A | 6.78 MHz | Subject to local acceptance | Fixed service & mobile service |
| 13.553 MHz-13.567 MHz | B | 13.56 MHz | Worldwide | Fixed & mobile services except aeronautical mobile (R) service |
| 26.957 MHz-27.283 MHz | B | 27.12 MHz | Worldwide | Fixed & mobile service except aeronautical mobile service, CB radio |
| 40.66 MHz-40.7 MHz | B | 40.68 MHz | Worldwide | Fixed, mobile services & earth exploration-satellite service |
| 433.05 MHz-434.79 MHz | A | 433.92 MHz | only in Region 1, subject to local acceptance | amateur service & radiolocation service, additional apply the provisions of footnote 5.280 |
| 902 MHz-928 MHz | B | 915 MHz | Region 2 only (with some exceptions) | Fixed, mobile except aeronautical mobile & radiolocation service; in Region 2 additional amateur service |
| 2.4 GHz-2.5 GHz | B | 2.45 GHz | Worldwide | Fixed, mobile, radiolocation, amateur & amateur-satellite service |
| 5.725 GHz-5.875 GHz | B | 5.8 GHz | Worldwide | Fixed-satellite, radiolocation, mobile, amateur & amateur-satellite service |

TABLE 2-continued

| Frequency range | Type | Center frequency | Availability | Licensed users |
|---|---|---|---|---|
| 24 GHz-24.25 GHz | B | 24.125 GHz | Worldwide | Amateur, amateur-satellite, radiolocation & earth exploration-satellite service (active) |
| 61 GHz-61.5 GHz | A | 61.25 GHz | Subject to local acceptance | Fixed, inter-satellite, mobile & radiolocation service |
| 122 GHz-123 GHz | A | 122.5 GHz | Subject to local acceptance | Earth exploration-satellite (passive), fixed, inter-satellite, mobile, space research (passive) & amateur service |
| 244 GHz-246 GHz | A | 245 GHz | Subject to local acceptance | Radiolocation, radio astronomy, amateur & amateur-satellite service |

ISM bands are also been shared with (non-ISM) license-free communications applications such as wireless sensor networks in the 915 MHz and 2.450 GHz bands, as well as wireless LANs (e.g., Wi-Fi) and cordless phones in the 915 MHz, 2.450 GHz, and 5.800 GHz bands.

Additionally, the 5 GHz band has been allocated for use by, e.g., WLAN equipment, as shown in Table 3:

TABLE 3

| Band Name | Frequency Band | Dynamic Freq. Selection Required (DFS)? |
|---|---|---|
| UNII-1 | 5.15 to 5.25 GHz | No |
| UNII-2 | 5.25 to 5.35 GHz | Yes |
| UNII-2 Extended | 5.47 to 5.725 GHz | Yes |
| UNII-3 | 5.725 to 5.825 GHz | No |

User client devices (e.g., smartphone, tablet, phablet, laptop, smartwatch, or other wireless-enabled devices, mobile or otherwise) generally support multiple RATs that enable the devices to connect to one another, or to networks (e.g., the Internet, intranets, or extranets), often including RATs associated with both licensed and unlicensed spectrum. In particular, wireless access to other networks by client devices is made possible by wireless technologies that utilize networked hardware, such as a wireless access point ("WAP" or "AP"), small cells, femtocells, or cellular towers, serviced by a backend or backhaul portion of service provider network (e.g., a cable network). A user may generally access the network at a node or "hotspot," a physical location at which the user may obtain access by connecting to modems, routers, APs, etc. that are within wireless range.

5G New Radio (NR) and NG-RAN (Next Generation Radio Area Network)

NG-RAN or "NextGen RAN (Radio Area Network)" is part of the 3GPP "5G" next generation radio system. 3GPP is currently specifying Release 16 NG-RAN, its components, and interactions among the involved nodes including so-called "gNBs" (next generation Node B's or eNBs). NG-RAN will provide high-bandwidth, low-latency wireless communication and efficiently utilize, depending on application, both licensed and unlicensed spectrum of the type described supra in a wide variety of deployment scenarios, including indoor "spot" use, urban "macro" (large cell) coverage, rural coverage, use in vehicles, and "smart" grids and structures. NG-RAN will also integrate with 4G/4.5G systems and infrastructure, and moreover new LTE entities are used (e.g., an "evolved" LTE eNB or "eLTE eNB" which supports connectivity to both the EPC (Evolved Packet Core) and the NR "NGC" (Next Generation Core).

FIG. 1 illustrates the 3GPP 5G NR architecture 100.

In some aspects, Release 16 NG-RAN leverages technology and functions of extant LTE/LTE-A technologies (colloquially referred to as 4G, 5G), as bases for further functional development and capabilities. For instance, one of the salient features of LTE-A is extending LTE into the 5G GHz unlicensed spectrum, comprising the spectrum between 5150 MHz and 5995 MHz. In addition, the 5 GHz band is currently utilized by the recent WLAN technologies, which is referred to 802.11n/ax/ax. LTE-A Release 10 specification 3GPP TR 36.808 introduced carrier aggregation (in other words, multi-carrier operation), in order to increase the bandwidth, and thereby throughput. See inter alia "3rd Generation Partnership Project; Technical Specification Group Radio Access Network; Evolved Universal Terrestrial Radio Access Network (E-UTRAN); Carrier Aggregation (Release 10)" dated August 2010, which is incorporated herein by reference in its entirely.

3GPP TS 36.212 defines the Random-Access Channel (RACH) procedure for LTE and LTE-A. When a UE is switched on for the very first time, it will start searching the network and the available frequency band. There is a possibility that there are many frequency bands from different networks to which the UE can connect. Therefore, a UE synchronizes to the network through the established RACH protocol. Each UE sends a specific preamble on the RACH to the network. If two UEs use the same RACH simultaneously, then there can be a collision. 3GPP TS 36.212 defines 64 different preambles pattern available to UE, and UE can decide which of them to use randomly. If the UE transmission is successful, an eNB sends "Random Access Response" to the UE on the DL-SCH (Downlink Shared Channel), and grants the UE network access and allocates frequency spectrum to the UE.

Similar to the above-described RACH procedure, when a 5G NR/NG-RAN radio initially connects to a 5G NR/NG-RAN network, it uses a random access protocol. Specifically, in 5G NR/NG-RAN, initial accesses generally resemble a standard procedure that a legacy LTE system relies upon.

However, regarding specifically how the initial access is performed, 5G NR/NG-RAN differs from the legacy LTE operation significantly. In the legacy LTE implementation, the synchronization signals are transmitted by using omni-directional antennas, while in 5G NR/NG-RAN an NR/NG gNB may employ beam sweeping and management when transmitting the synchronization signals. At the beginning of the 5G random access procedure, both the UE and the gNB are not aware of the appropriate beam directions; hence, initial synchronization signals may be sent with multiple beam sweeping. After detecting the initial synchronization signals, the UE selects the best gNB beam for further DL acquisition. The gNB also utilizes multiple Rx beams, since the position of the UE is unknown. The gNB provides multiple RACH resources to the UE, and applies one Rx beam per each RACH resource.

Multi-Cell Broadcast RACH Procedure—

In Release 16 LTE and Release 15 NR, the RACH procedure is a four-step process as shown in FIG. 1A. The UE 105 selects a RACH preamble sequence (Msg1) and sends to the gNB 103 via the nearest RACH occasion (occurs every 10, 20, 40, 80, 160 ms) on the Uplink (UL). The gNB responds to the detected preamble (msg2) with a Random Access Response (RAR). Upon receiving msg2, the UE 105 responds msg3 over the Physical Uplink Shared Channel (PUSH) channel. The gNB 103 confirms receiving of Msg3 by sending Msg4 on Physical Downlink Shared Channel (PDSH).

In Release 16 NR (Rel-16), a 2-step RACH procedure was introduced with msgA transmitted by the Rel-16 compliant UE 109 and msgB transmitted by the Rel-16 compliant gNB 107 in response.

In all cases, the current RACH procedure is a point-point-point process that is performed between a single UE and a single cell or eNB/gNB; i.e. only one RACH procedure is active at a time for a given MAC entity.

The Conditional Handover (CHO) is proposed in 3GPP to improve Handover (HO) robustness for connected-mode mobility. In conditional HO, a UE can autonomously initiate an HO to a pre-configured target cell without an explicit HO command. Hence, the conditional HO will avoid radio link failures which may happen during the handover procedure due to the UE missing an HO command, or the network not receiving one or more measurement reports from the UE.

Statistics show a median interruption time of 50 ms for each HO in LTE. The RACH-less HO has been proposed to reduce interruptions during the data transmission in LTE (e.g. 4G and 5G HO). In RACH-less HO, a UE starts data transmission and reception to/from a target cell after HO without going through a RACH procedure. The RACH-less HO is feasible when the source and target cell both have the same timing advance, including similar propagation distance to the UE.

Both of the Conditional HO and RACH-less HO do not change the basic 4-step and 2-step RACH procedures described above.

One drawback of the existing RACH procedure(s) is that UEs must perform the RACH procedure one cell at a time, as a point-to-point process. Additionally, the successful completion of the procedure can never be guaranteed, for instance, due to poor UL coverage, overloading of Physical RACH (PRACH) resources, or persistent inter-cell/inter-RAT interference or LBT (listen before talk) failures. Therefore, a considerable amount of time may elapse due to successive RACH procedure failures across different cells until the UE finally succeeds. This causes an interruption in the data transmission for the UE and degrades the user's experience, as well as resulting in other undesirable conditions within the network.

Accordingly, there is a need for, inter alia, improved apparatus and methods for providing multi-cell access procedures (such as e.g., RACH procedures for 3GPP NR/LTE systems). Such multi-cell apparatus and methods would ideally overcome one or more of the foregoing drawbacks.

SUMMARY

The present disclosure addresses the foregoing needs by providing, inter alia, apparatus and methods for apparatus and methods for providing multi-cell access procedures, such as multi-cell RACH procedures for 3GPP NR/LTE systems.

In a first aspect of the disclosure, methods and apparatus for multi-cell broadcast RACH for NR and LTE are disclosed. In one embodiment, an enhanced UE (UEe) attempts to access multiple cells simultaneously. This greatly increases the likelihood of RACH procedure success on the first attempt whether operating using licensed or unlicensed spectrum, thereby reducing connection latency. In one variant, the multi-cell RACH methods and apparatus are configured for use in a synchronous deployment with time-synchronized cells of the same PLMN.

In another aspect, a method of connecting a user device e.g., 3GPP user device to a wireless network having plurality of access nodes is disclosed. In one embodiment, the method includes: transmitting at least one random access preamble to the plurality of access nodes; receiving at least one random access response (RAR) sent from each of the plurality of access nodes in response to the transmitted random access preamble; selecting at least one of the received RARs; and transmitting a message to a random access node associated with the selected received RAR.

In one variant, the wireless access nodes each comprise a 5G NR (New Radio)-compliant enhanced gNB (gNBe).

In another variant, the transmitting the at least one random access preamble comprises: selecting one or more Random Access Channel (RACH) Occasions (ROs); selecting a random access preamble among a set of pre-defined preambles; selecting resources to be used in transmitting the selected random access preambles; and transmitting of the selected preambles per the selected one or more ROs using the selected resources.

In another variant, the selecting the one or more ROs is based at least on an SSB (Synchronization Signal/PBCH block) or a CSI-RS (Channel State Information Reference Signal).

In another aspect of the disclosure, a 5G NR-U unlicensed device (e.g. gNBe and/or UEe) operating across unlicensed frequency band is disclosed. In one implementation, the device is a 5G NR-U UE device that performs Listen Before Talk (LBT) procedures as part of communication with a gNBe.

In another aspect of the disclosure, a wireless access node is disclosed. In one embodiment, the node includes a 3GPP-compliant gNBe and includes: a receiver module, a transmitter module, and multi-cell RACH logic. In one variant, the gNBe may further include: a processor apparatus; a wireless modem chipset in data communication with processor apparatus; a program memory in data communication with processor apparatus; an RF front end module; and a network interface module in data communication with a core network. In further implementation, the program memory includes at least one program which is configured to, when executed to the processor apparatus, causes transmission of broadcast RACH signals in support of multi-cell RACH procedures.

In another embodiment, the node includes a 5G NR gNBe having at least one CU and a plurality of DU in data communication therewith. In one variant, the multi-cell logic is disposed within one or more of the DU. In another variant, the logic is divided between one or more of the DU and the CU for that gNBe. In yet another variant, the DU are sufficiently separate in geographic or spatial terms such as to be able to act as separate access nodes (or even cells) for purposes of multi-node/cell UE connection procedures (i.e., the procedures are implemented intra-gNBe).

In another aspect of disclosure, a user device such as e.g., a 3GPP-compliant UE (e.g., 5G NR enabled) is disclosed. In one embodiment, the UE includes: a receiver module, a transmitter module, and enhanced RACH logic. In one variant, the UE may further include: a processor apparatus; a wireless modem chipset in data communication with processor apparatus; a program memory in data communication with processor apparatus; a mass storage; and an RF front end module. In further implementation, the program memory includes at least one program which is configured to, when executed to the processor apparatus, causes reception and transmission of multi-cell RACH signals.

In a further aspect of the disclosure, a method of operating a wireless network having a plurality of wireless access nodes is described. In one embodiment, the method includes transmitting configuration information, the configuration information enabling a receiving wireless user device to attempt access of at least two of the plurality of wireless access nodes at least partly in parallel.

In one variant of the method, the transmitting configuration information comprises broadcasting at least one of synchronization data or a reference signal that enables multi-access node mapping for one or more access opportunities.

In one implementation of the foregoing variant, the wireless network having the plurality of access nodes includes a 3GPP (Third Generation Partnership Project) Long Term Evolution (LTE) or Fifth Generation New Radio (5G NR) compliant network; and the broadcasting at least one of synchronization data or a reference signal that enables multi-access node mapping for one or more access opportunities includes broadcasting SSB (Synchronization Signal/PBCH block) mapping data within at least one SIB (system information block).

In one configuration thereof, the broadcasting SSB (Synchronization Signal/PBCH block) mapping data within at least one SIB (system information block) includes broadcasting the SSB mapping data within a RACH (Random Access Channel) configuration information element (IE) within the at least one SIB, the mapping data indicating at least one RACH occasion (RO).

In another configuration, the method further includes broadcasting at least one data bit within the at least one SIB, the at least one data bit configured to indicate to the receiving wireless user device that multi-access node random access channel procedures may be utilized.

In another aspect of disclosure, computer readable apparatus is disclosed. In one embodiment, the apparatus includes a storage medium configured to store one or more computer program. In embodiment, the apparatus includes a program memory or HDD or SDD on a computerized controller device, such as MSO controller. In another embodiment, the apparatus includes a program memory, HDD or SDD on a computerized access node (e.g. gNBe) or user device (e.g., UEe).

In another aspect, a wireless premises device is disclosed. In one embodiment, the device includes a 3GPP NR-U or CBRS (Citizens Broadband Radio Service)-compliant FWA that is capable of data communication with multiple 3GPP-compliant gNBe within NR-U or CBRS frequency bands.

In one variant, the FWA apparatus comprises a premises device associated with a network operator (e.g., MSO) that is configured to communicate wirelessly with multiple CBSDe or xNBe devices to obtain high-speed data services from the CBSDes or xNBes and the MSO. In one implementation, the FWA apparatus is configured to operate at a sufficiently high power level so as to be classified as a Category B CBSDe CBRS device, and is mounted on the user's premises so as to enable backhaul for WLAN or wireline interfaces within the premises.

In another aspect, a multi-cell NR/LTE system is disclosed, wherein enhanced UEs uses a random access (RA) procedure to connect to multiple cells simultaneously. In one variant, each UEe uses a procedure based on the NR 4-Step RACH procedure to access multiple cells simultaneously. In another variant, the UEe uses a procedure based on the 2-Step RACH procedure to access multiple cells simultaneously.

In some variants, the multi-cell RACH procedure referenced above is used consistent with a synchronous deployment with time-synchronized cells of the same Public and Land Mobile Network (PLMN).

In another aspect, a multi-cell NR/LTE system utilizing the unlicensed spectrum is described. In exemplary embodiments of this system, the UEe or gNBe may perform a Listen-Before-Talk (LBT) procedure before any transmission steps of the above-referenced 4-step or 2-step procedures.

In yet another aspect, methods and apparatus for mapping resources within a broadcast context are disclosed. In one embodiment, the context comprises a 3GPP RACH context, and the mapping comprises an SSB (Synchronization Signal Block)-to-RO (RACH Occasion) broadcast mapping.

In yet a further aspect, methods and apparatus for reducing user device connection latency are disclosed.

In another aspect, network controller apparatus is disclosed. In one embodiment, the controller apparatus is in data communication with a plurality of cells (e.g., xNBes equipped with multi-cell UE connection logic) and is operative to coordinate and/or control which cells are utilized or advertised for multi-cell connection by network UE at any given time or as a function of operational conditions such as network or gNBe loading.

In another aspect of disclosure, a computer readable apparatus is disclosed. In one embodiment, the apparatus includes a storage medium configured to store one or more computer program. In embodiment, the apparatus includes a program memory, flash memory, or HDD or SSD on a computerized controller device, such as MSO or MNO network controller. In another embodiment, the apparatus includes a program memory, flash memory, or HDD or SDD on a computerized access node (e.g. gNBe) or a user device (e.g., UEe).

In a further aspect, an integrated circuit (IC) apparatus is disclosed. In one embodiment, the IC apparatus includes one or more individual ICs or chips that are configured to contain or implement computerized logic configured to enable multi-call access procedures and related management functions within a wireless-enabled user device.

These and other aspects shall become apparent when considered in light of the disclosure provided herein.

BRIEF DESCRIPTION OF THE DRAWINGS

FIGS. 4A-4B are a graphical representation of a prior art 3GPP IE (Information Element) used in RACH procedures.

FIGS. 5A-5B are a graphical representation of one embodiment of a 3GPP-compliant IE (Information Element) used in conjunction with the multi-cell RACH procedures of the disclosure.

FIGS. 2-3B and 5A-12 © Copyright 2019-2020 Charter Communications Operating, LLC. All rights reserved.

DETAILED DESCRIPTION

Figure 1:
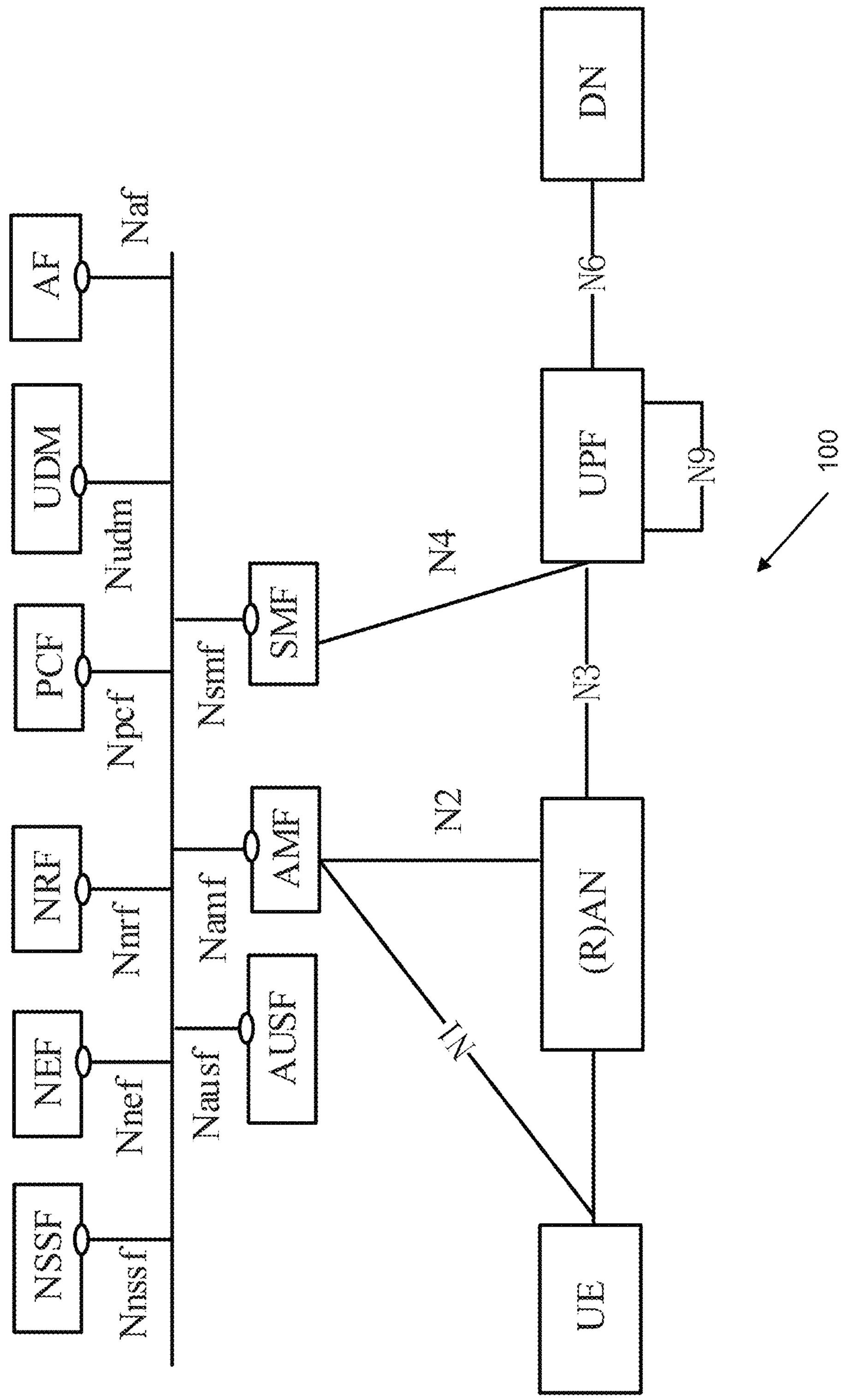
FIG. 1 (Prior Art)
FIG. 1 is a block diagram illustrating the 3GPP 5G NR architecture.

Reference is now made to the drawings wherein like numerals refer to like parts throughout.

As used herein, the term "access node" refers generally and without limitation to a network node which enables communication between a user or client device and another entity within a network, such as for example a CBRS CBSD, small cell, a cellular xNB, a Wi-Fi AP, or a Wi-Fi-Direct enabled client or other device acting as a Group Owner (GO).

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment. Applications as used herein may also include so-called "containerized" applications and their execution and management environments such as VMs (virtual machines) and Docker and Kubernetes.

As used herein, the term "CBRS" refers without limitation to the CBRS architecture and protocols described in *Signaling Protocols and Procedures for Citizens Broadband Radio Service* (*CBRS*): *Spectrum Access System* (*SAS*)—*Citizens Broadband Radio Service Device* (*CBSD*) *Interface Technical Specification*—Document WINNF-TS-0016, Version V1.2.1.3, January 2018, incorporated herein by reference in its entirety, and any related documents or subsequent versions thereof.

As used herein, the term "central unit" or "CU" refers without limitation to a centralized logical node within a wireless network infrastructure. For example, a CU might be embodied as a 5G/NR gNB Central Unit (gNB-CU), which is a logical node hosting RRC, SDAP and PDCP protocols of the gNB or RRC and PDCP protocols of the gNB that controls the operation of one or more gNB-DUs, and which terminates the F1 interface connected with one or more DUs (e.g., gNB-DUs) defined below.

As used herein, the terms "client device" or "user device" or "UE" include, but are not limited to, set-top boxes (e.g., DSTBs), gateways, modems, FWA devices, personal computers (PCs), and minicomputers, whether desktop, laptop, or otherwise, and mobile devices such as handheld computers, PDAs, personal media devices (PMDs), tablets, "phablets", smartphones, and vehicle infotainment systems or portions thereof.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "distributed unit" or "DU" refers without limitation to a distributed logical node within a wireless network infrastructure. For example, a DU might be embodied as a 5G/NR gNB Distributed Unit (gNB-DU), which is a logical node hosting RLC, MAC and PHY layers of the gNB or en-gNB, and its operation is partly controlled by gNB-CU (referenced above). One gNB-DU supports one or multiple cells, yet a given cell is supported by only one gNB-DU. The gNB-DU terminates the F1 interface connected with the gNB-CU.

As used herein, the term "DOCSIS" refers to any of the existing or planned variants of the Data Over Cable Services Interface Specification, including for example DOCSIS versions 1.0, 1.1, 2.0, 3.0, 3.1 and 4.0 and any EuroDOCSIS counterparts or derivatives relating thereto, as well as so-called "Extended Spectrum DOCSIS".

As used herein, the term "headend" or "backend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, over-the-top services, streaming services, and the Internet.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), and 4G/4.5G LTE.

As used herein, the term "memory" includes any type of integrated circuit or other storage device adapted for storing digital data including, without limitation, ROM, PROM, EEPROM, DRAM, SDRAM, (G)DDR/2/3/4/5/6 SDRAM, EDO/FPMS, RLDRAM, SRAM, "flash" memory (e.g., NAND/NOR), 3D memory, stacked memory such as HBM/HBM2, and spin Ram, PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., 802.16), or other network service provider having infrastructure required to deliver services including without limitation voice and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A/LTE-U/LTE-LAA, 5G NR, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB 2.0, 3.0. OTG), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), LTE/LTE-A/LTE-U/LTE-LAA, Wi-Fi (802.11), WiMAX (802.16), Z-wave, PAN (e.g., 802.15), or power line carrier (PLC) families.

As used herein the terms "5G" and "New Radio (NR)" refer without limitation to apparatus, methods or systems compliant with any of 3GPP Release 15-17, and any modifications, subsequent Releases, or amendments or supplements thereto which are directed to New Radio technology, whether licensed or unlicensed.

As used herein, the term "QAM" refers to modulation schemes used for sending signals over e.g., cable or other networks. Such modulation scheme might use any constellation level (e.g. 16-QAM, 64-QAM, 256-QAM, etc.) depending on details of a network. A QAM may also refer to a physical channel modulated according to the schemes.

As used herein, the term "quasi-licensed" refers without limitation to spectrum which is at least temporarily granted, shared, or allocated for use on a dynamic or variable basis, whether such spectrum is unlicensed, shared, licensed, or otherwise. Examples of quasi-licensed spectrum include without limitation CBRS, DSA, GOGEU TVWS (TV White Space), and LSA (Licensed Shared Access) spectrum.

As used herein, the terms "RA" and "RACH" refer to, without any limitation, Random Access and Random Access Channel procedures in a wireless communication systems (e.g. LTE, 4G, 5G).

As used herein, the term "SAS (Spectrum Access System)" refers without limitation to one or more SAS entities which may be compliant with FCC Part 96 rules and certified for such purpose, including (i) Federal SAS (FSAS), (ii) Commercial SAS (e.g., those operated by private companies or entities), and (iii) other forms of SAS.

As used herein, the term "server" refers to any computerized component, system or entity regardless of form which is adapted to provide data, files, applications, content, or other services to one or more other devices or entities on a computer network.

As used herein, the term "shared access" refers without limitation to (i) coordinated, licensed sharing such as e.g., traditional fixed link coordination in 70/80/90 GHz and the U.S. FCC's current rulemaking on potential database-coordinated sharing by fixed point-to-multipoint deployments in the C-band (3.7-4.2 GHz); (ii) opportunistic, unlicensed use of unused spectrum by frequency and location such as TV White Space and the U.S. FCC's proposal to authorize unlicensed sharing in the uplink C-band and other bands between 5925 and 7125 MHz; (iii) two-tier Licensed Shared Access (LSA) based on geographic areas and database assist such as e.g., within 3GPP LTE band 40 based on multi-year sharing contracts with tier-one incumbents; and (iv) three-tier shared access (including quasi-licensed uses) such as CBRS, and other bands such as e.g., Bands 12-17 and 71.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein the terms "unlicensed" and "unlicensed spectrum" refer without limitation to radio frequency spectrum (e.g., from the sub-GHz range through 100 GHz) which is generally accessible, at least on a part time basis, for use by users not having an explicit license to use, such as e.g., ISM-band, 2.4 GHz bands, 5 GHz bands, 6 GHz bands, quasi-licensed spectrum such as CBRS, 60 GHz (V-Band), mmWave bands including 24-100 GHz, and others germane to the geographic region of operation (whether in the U.S. or beyond) that will be appreciated by those of ordinary skill given the present disclosure.

As used herein, the term "users" may include without limitation end users (e.g., individuals, whether subscribers of the MSO network, the MNO network, or other), the receiving and distribution equipment or infrastructure such as a CPE/FWA or CBSD, venue operators, third party service providers, or even entities within the MSO itself (e.g., a particular department, system or processing entity).

As used herein, the term "Wi-Fi" refers to, without limitation and as applicable, any of the variants of IEEE Std. 802.11 or related standards including 802.11 a/b/g/n/s/v/ac/ad/ax/ay/ba/be or 802.11-2012/2013, 802.11-2016, as well as Wi-Fi Direct (including inter alia, the "Wi-Fi Peer-to-Peer (P2P) Specification", incorporated herein by reference in its entirety).

As used herein, the term "wireless" means any wireless signal, data, communication, or other interface including without limitation Wi-Fi, Bluetooth/BLE, 3G (3GPP/3GPP2), HSDPA/HSUPA, TDMA, CBRS, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A/LTE-U/LTE-LAA, 5G NR, LoRa, IoT-NB, SigFox, analog cellular, CDPD, satellite systems, millimeter wave or microwave systems, acoustic, and infrared (i.e., IrDA).

As used herein, the term "wireline" includes electrical and optical transmission media such as, without limitation, coaxial cable, CAT-5/6 cable, and optical fiber.

As used herein, the term "xNB" refers to any 3GPP-compliant node including without limitation eNBs (eUTRAN) and gNBs (5G NR).

Overview

In one exemplary aspect, the present disclosure describes various embodiments of a multi-cell broadcast access procedure (e.g., RACH procedure) for use within wireless networks such as those compliant with 3GPP standards and protocols (e.g., those operating under the 5G NR and/or LTE standards). In one variant, an enhanced UE (UEe) attempts random access of multiple cells simultaneously, in contrast with the prior art "serialized" approach as previously described. These simultaneous access attempts greatly increase the likelihood of the RACH procedure being successful on the first attempt, thereby reducing connection latency and enhancing user experience (as well as other aspects of network operation).

In the exemplary embodiment, the aforementioned simultaneous or multi-cell RACH process is implemented within a synchronous deployment with time-synchronized cells of the same PLMN. However, the disclosure also contemplates use of the methods and apparatus in other contexts, including within different PLMNs and networks without synchronization.

Moreover, the methods and apparatus described herein can advantageously be adapted to both licensed and unlicensed spectrum use cases, including for example within NR-U (New Radio-Unlicensed) systems which use LBT (listen before talk) protocols, to provide similar benefits.

Detailed Description of Exemplary Embodiments

Exemplary embodiments of the apparatus and methods of the present disclosure are now described in detail. While these exemplary embodiments are described in the context of the previously mentioned wireless access nodes (e.g., gNBs) associated with or supported at least in part by a managed network of a service provider (e.g., MSO and/or MNO networks), other types of radio access technologies ("RATs"), other types of networks and architectures that are configured to deliver digital data (e.g., text, images, games, software applications, video and/or audio) may be used consistent with the present disclosure. Such other networks or architectures may be broadband, narrowband, or otherwise, the following therefore being merely exemplary in nature.

It will also be appreciated that while described generally in the context of a network providing service to a customer or consumer or end user or subscriber (i.e., within a prescribed service area, venue, or other type of premises), the present disclosure may be readily adapted to other types of environments including, e.g., outdoors, commercial/retail, or enterprise domain (e.g., businesses), or even governmental uses. Yet other applications are possible.

Moreover, while certain embodiments are described in the context of unlicensed spectrum such as NR-U, it will be appreciated by those of ordinary skill given the present disclosure that various of the methods and apparatus described herein may be applied to spectrum or bandwidth within a licensed spectrum context; e.g., for cellular voice or data bandwidth/spectrum allocation, and/or in a quasi-licensed context such as that within the CBRS or equivalent systems such as in the 3.5 GHz band (specifically 3,550 to 3,700 MHz), or above 4.0 GHz (e.g., currently proposed allocations up to 4.2 GHz).

Further, while some aspects of the present disclosure are described in detail with respect to so-called "4G/4.5G" 3GPP Standards (aka LTE/LTE-A) and so-called 5G "New Radio" (3GPP Release 15 and TS 38.XXX Series Standards and beyond), such aspects are generally access technology "agnostic" and hence may be used across different access technologies, and can be applied to, inter alia, any type of P2MP (point-to-multipoint) or MP2P (multipoint-to-point) or Multefire technology.

Other features and advantages of the present disclosure will immediately be recognized by persons of ordinary skill in the art with reference to the attached drawings and detailed description of exemplary embodiments as given below.

Multi-Cell Random Access Methods

Figure 2A:
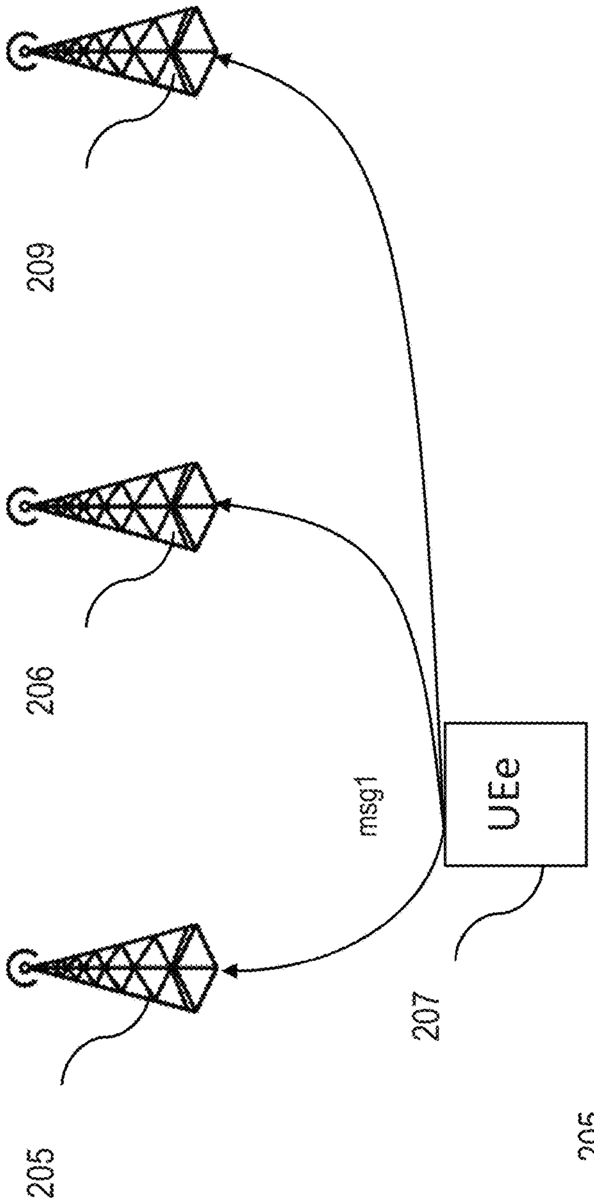
FIGS. 2A-2C are graphical illustrations of one exemplary embodiment of multi-cell RACH procedures according to the present disclosure.
Figure 2B:
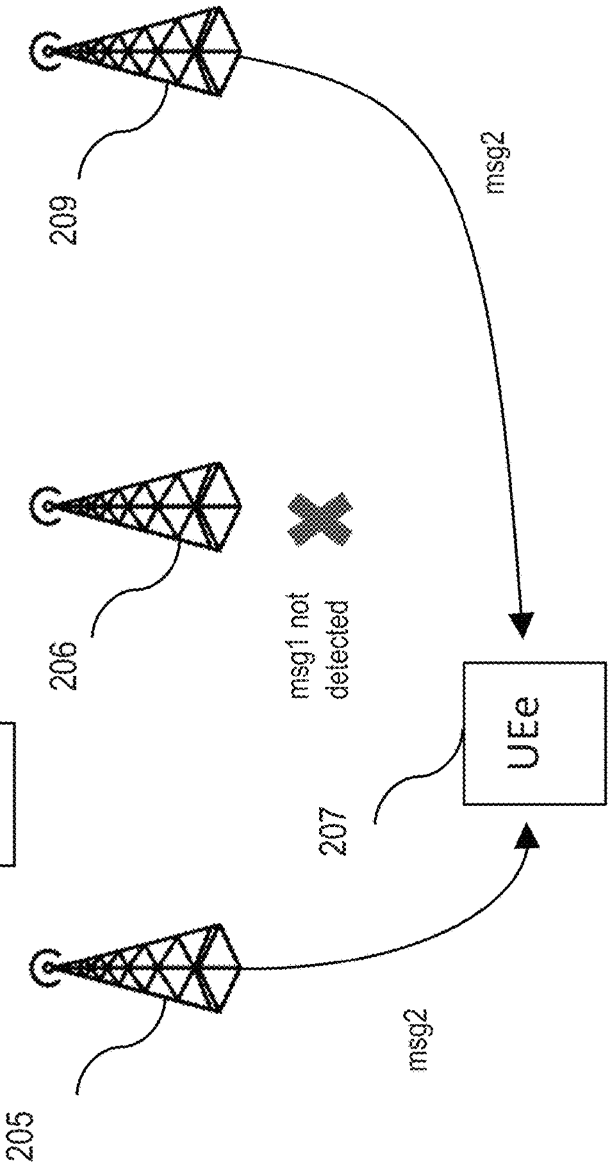
Figure 2C:
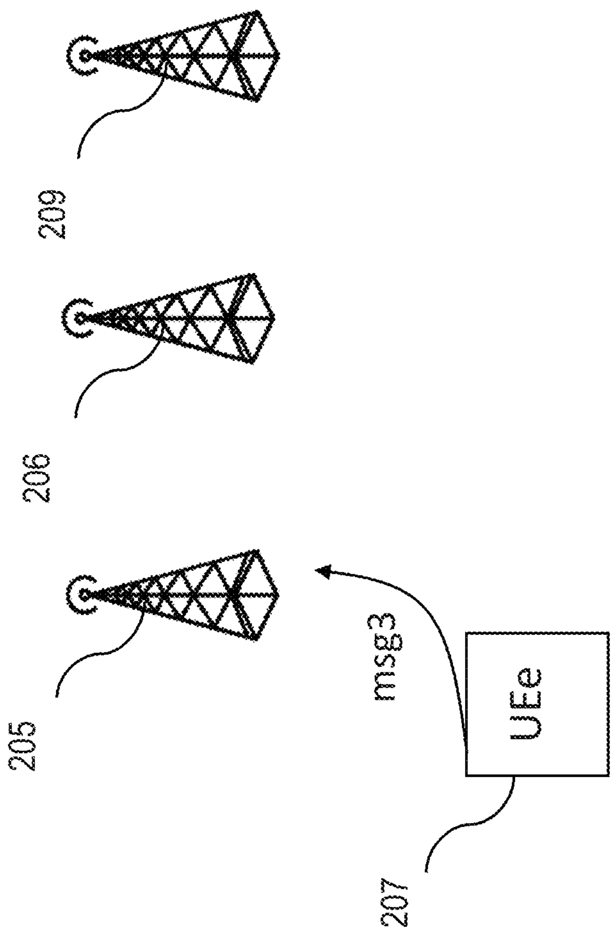

FIG. 2A-2C graphically illustrate, at a high level, exemplary protocols for an enhanced UE (UEe) attempting to connect to multiple cells in a wireless communication system according to one embodiment of the present disclosure.

As shown in FIG. 2A, the enhanced user device (e.g., multi-cell RA enabled UEe) 207 transmits a first message to the various eligible or participating access nodes (e.g., 5G NR gNBes with multi-cell RA capability). As discussed in greater detail below, these gNBes may be eligible or not based on any number of criteria, such as being within radio range of the UEe, being selected or de-selected for participation by a controller entity or other network process, based on internal opt in/out decision logic within the gNB e for when such messages are received, etc.

As shown in FIG. 2B, one of the gNBes 206 in this example does not receive the transmitted UEe message, such as due to interference or low signal strength based on range or topographical features.

As shown in FIG. 2C, based on execution of the multi-cell RA protocol, the UEe 207 ultimately selects e.g., one of the responding gNBes for further connection procedures. Since multiple gNBes 205, 209 in this example responded to the UEe's initial messaging, the UEe can select (based on e.g., one or more selection criteria) the gNB e for connection which is most optimal; e.g., which provides the lowest latency or other desired performance attribute(s).

Figure 3:
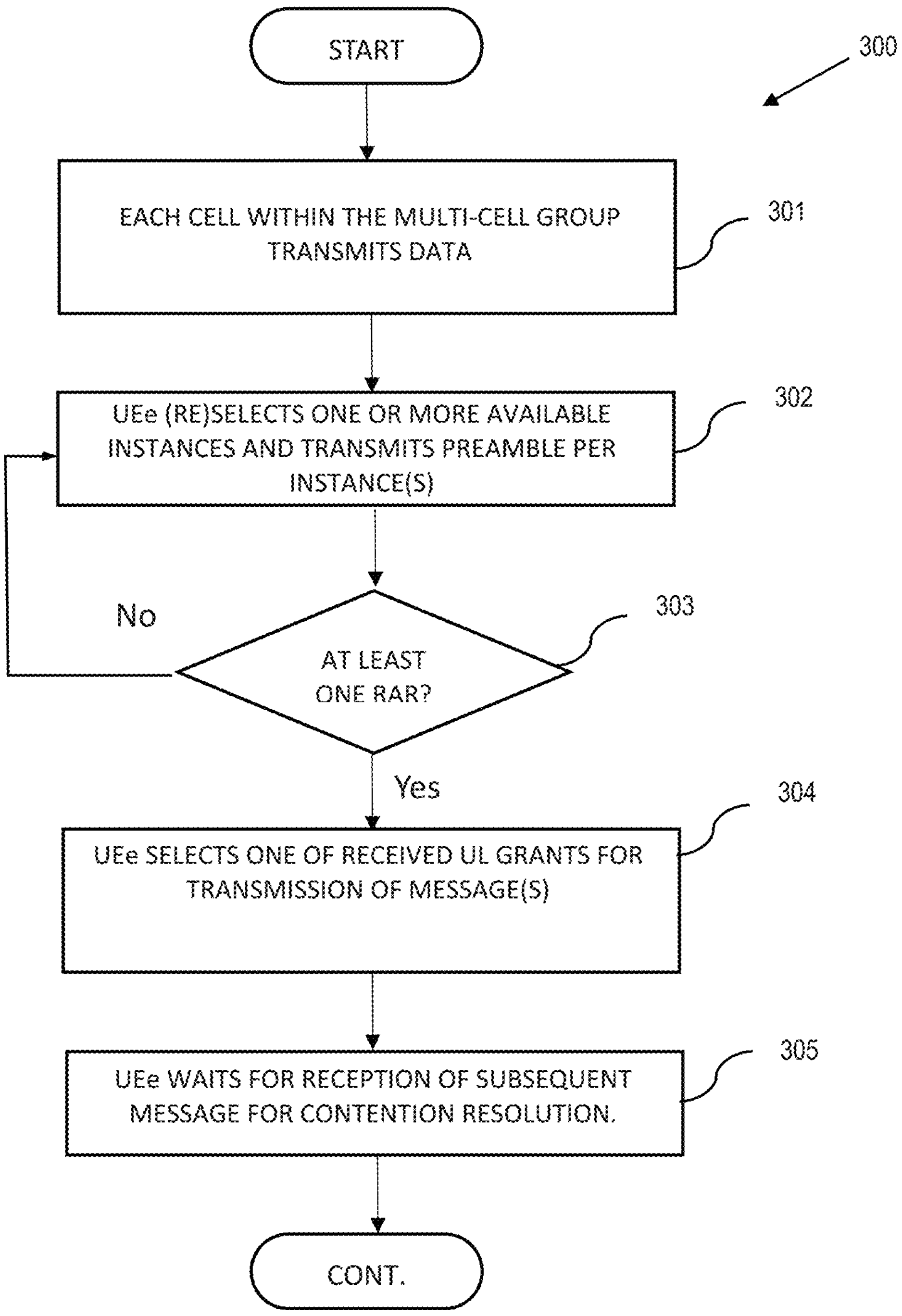
FIG. 3 is a logic flow diagram illustrating an exemplary embodiment of a general method for multi-cell RACH according to the disclosure.

FIG. 3 is a logic flow diagram illustrating an exemplary embodiment of a general method for multi-cell RACH according to the disclosure. As shown, the method 300 includes first transmitting data from each cell (e.g., base station) within a multi-cell group per step 301. As discussed in greater detail below, this data may be e.g., useful for the receiving user device(s) (e.g., UEe) in support of multi-cell RA procedures.

Per step 302, a recipient multi-cell enabled UE 207 selects one or more available instances (e.g. ROs) and uses this/these instances to transmit preamble or similar data.

Per step 303, the UEe determines whether one or more responses (e.g., RACH RAR) have been received in response to its transmission of step 302. If not, the preamble transmission(s) is/are repeated until a response from at least one cell is received.

When per step 303 a response is received by the UEe, it selects one of a prior UL grant received for use in transmission of subsequent messages (step 304).

Lastly, per step 305, the UEe waits for reception of a subsequent message for e.g., contention resolution, by which the UEe accesses the RF medium (e.g., unlicensed or licensed or quasi-licensed frequency band(s)).

Figure 1A:
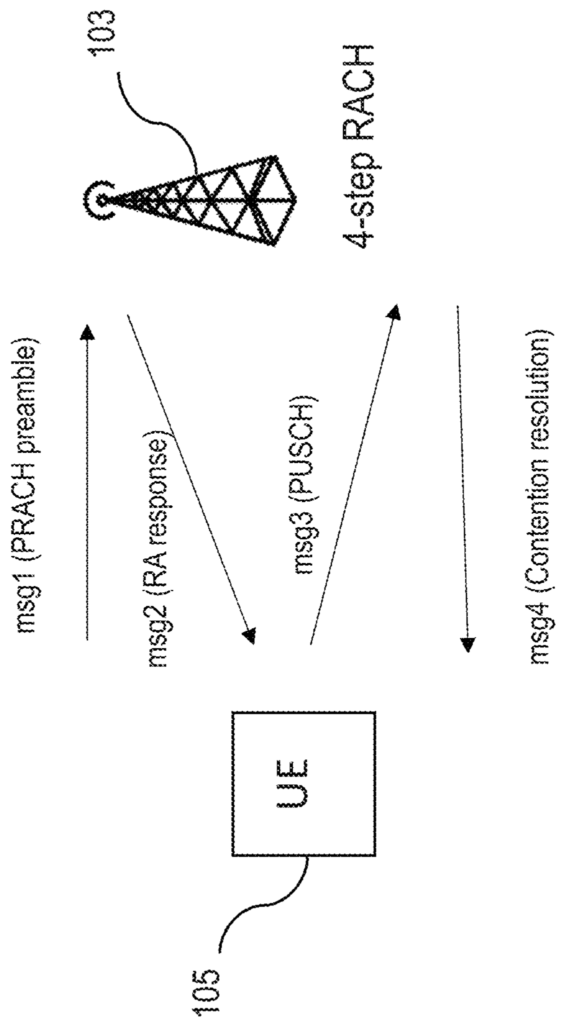
FIG. 1A (Prior Art)
FIG. 1A is graphical illustration of one exemplary prior art approach to RACH (4-step).
Figure 3A:
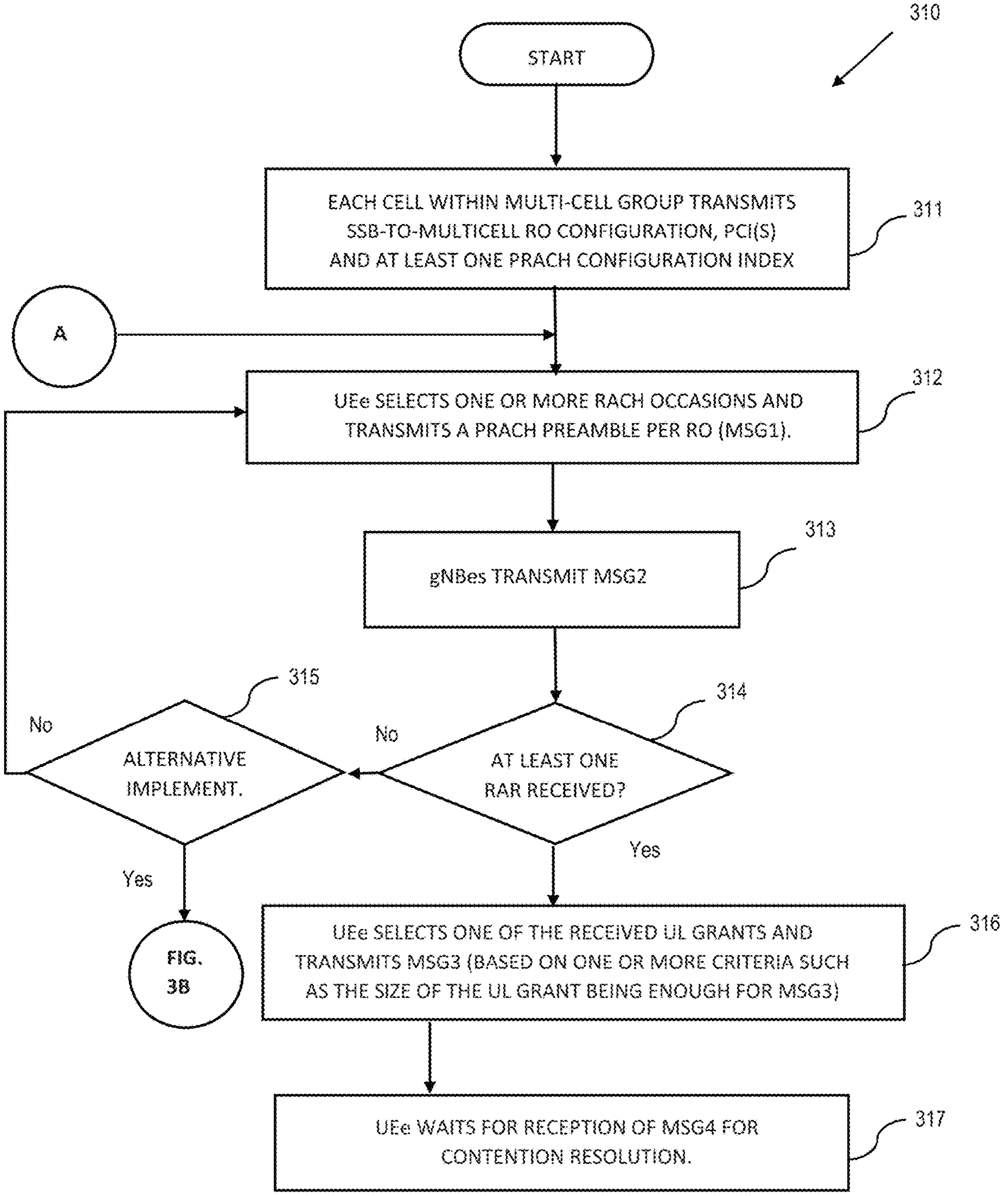
FIGS. 3A-3B are a logic flow diagram illustrating an exemplary implementation of a method for multi-cell RACH according to the disclosure.

FIG. 3A is a flowchart illustrating an exemplary embodiment of a generalized method 310 according to the present disclosure for UEe connection to multiple cells simultaneously, based generally on the 4-step RACH shown in FIG. 1A. This methodology is described in the exemplary context of the RA procedure referenced herein, although it will be appreciated that it may be adapted to other procedures and applications by those of ordinary skill given the present disclosure. Moreover, the method 310 is described with reference to the gNBe and UEe of FIG. 2A-2C, although it may be practiced by other entities or network configurations.

As an aside, the 4-step 5G NR/NG-RAN RACH procedure previously referenced (i.e., the general procedure which a UE implements when turned on) includes the following four steps:

1. Based on synchronization information from the gNB, the UE selects a RACH preamble sequence (msg1) and sends it at the nearest RACH occasion (RO) (occurs every 10, 20, 40, 80, or 160 ms). Due to reciprocity, the UE may use the Tx beam corresponding to the best Rx beam determined during synchronization.
2. The gNB responds to the detected preambles with a random access response (RAR) UL grant (msg2) in PDSCH by using one selected beam. After that, the UE and the gNB establish coarse beam alignment that could be utilized at the subsequent steps.
3. Upon receiving msg2, the UE responds over the resources scheduled by the gNB, which is thus aware where to detect the msg3, and which gNB Rx beam should be used.
4. The gNB confirms the above by sending msg4 in PDSCH using the gNB Tx beam determined at the previous step.

If two or more UEs select the same preamble, it may be decoded at the gNB as one preamble, and the gNB then transmits its RAR as for one UE. In this case, a preamble collision occurs at the third step above. The UE transmits with its default power or the power advised by the gNB. In case of an unsuccessful transmission, the UE follows a power-ramping procedure.

Returning again to the context of the present disclosure (FIG. 3A), per step 311 of the method, each cell within multi-cell group transmits a SSB-to-Multicell RO configuration, PCI values, and at least one PRACH configuration index. In the existing NR RACH procedure, an SSB-to-RO mapping configuration is broadcast per cell, and a UE's choice of a RO depends upon measuring the best Synchronization Signal Blocks (SSBs) (e.g., highest Reference Signal Received Power (RSRP)).

FIGS. 4A-4B shows RACH-ConfigCommon and RACH-ConfigGeneric Information Elements (IEs) described in 3GPP TS 38.331 V15.6.0 (2019-06) entitled "Technical Report—3rd Generation Partnership Project; Technical Specification Group Radio Access network; NR; Study on Radio Resource Control (RRC) protocol specification (Release 15)," incorporated herein by reference in its entirely. In exemplary embodiments of the present disclosure (as shown in FIGS. 5A-5B), the broadcast SSB-to-RO mapping configuration indicated in RACH-ConfigCommon in SIB1 is enhanced to a SSB-to-multi-cell RO mapping configuration, either according to Operations, Administration and Maintenance (OAM) or Self-Organizing Network (SON) configurations.

If different ROs are used for each cell, then PRACH configuration indices that indicate time-frequency occurrence of each RO of each cell are indicated by higher-layer signalling, such as in the RACH-ConfigureGeneric IE per cell, as exemplified in FIGS. 5A-5B (for 3 cells in this example).

Per step 312 of the method 310, the UEe selects one or more RACH occasions based on either SSB or Channel State Information Reference (CSI-RS) Signal, and transmits a PRACH preamble per RO (msg1). A separate RO in a different UL Bandwidth Part (BWP) may be used for each cell in the most general case. Alternatively, the ROs maybe in the same slot but spread across different time-domain locations (e.g., in consecutive time slots). Alternatively, the ROs maybe in the same time slot but spread across different frequency domain locations (e.g., up to 8).

As a special case, the ROs of the different cell may overlap partially or completely in time-frequency resources; in this case, the same msg1 with the same PRACH format is received by the three cells.

Per step 313, the cells that successfully detect the PRACH preamble of step 311 send a Random Access Response (RAR or msg2) on their respective PDCCHs. Notably, at this point in the procedure, it is not necessary for the cells to distinguish between a multi-cell RACH procedure or conventional RACH procedure.

After a PRACH transmission by a UEe, the gNBe in one embodiment sends a DCI (format 1_0) scrambled with Random Access Radio Network Temporary Identifier (RA-RNTI), to schedule RAR (msg2) in PDSCH in one cell. RNTIs are use used to differentiate/identify a connected UEe in the cell, a specific radio channel, a group of UEes for which power control is issued by the gNBe and system information transmitted for all the UEes by a gNBe. See 3GPP TS 38.213 V15.6.0 (2019-06) entitled "Technical Report—3rd Generation Partnership Project; Technical Specification Group Radio Access network; NR; Physical Layer Procedure for Control (Release 15)," incorporated herein by reference in its entirety.

An RA-RNTI value is also used during the RA procedure. Specifically, the gNBe generates the RAR as a response to the PRACH transmitted by the UEe. The gNBe scrambles the PDCCH's CRC with the RA-RNTI value for transmission on PDSCH.

As a brief aside, in a DL frame, the PDCCH can be located in many different locations within the frequency domain, and the UEe may need to search all the possible locations. The range of possible locations for PDCCH is referred to as "search space," and each of the possible locations is called a PDCCH candidate. The search space indicates where the UEe may find its PDCCH. Each PDCCH carries one DCI, and is identified by RNTI. The RNTI is encoded in the CRC attachment of the DCI.

In order for the UEe to perform the search to find PDCCH location, it needs to have information on the associated DL BWP, PDCCH search space parameters and CORESET ID.

It is noted that, similar to 3GPP Release 15, Release 16 provides a UE with a capability of monitoring separate PDCCH per cell in potentially separate Type-1 PDCCH common search spaces. Each cell may broadcast Type-1 search space configurations of multiple cells. As an enhancement to 3GPP Release 16 capabilities, the network may configure multi-cell RACH with overlapping/common initial DL active BWPs for the multiple cells. As one exemplary low complexity solution, a single BWP with non-overlapping search spaces may be monitored by the UEe for the RARs without DL BWP switching. The PCIs of all cells are indicated by each cell as part of RACH-ConfigGeneric to enable cell-ID bases slot scrambling.

Since the UEe knows when it transmitted the PRACH preamble(s), the RA-RNTI derivations remains the same as Release 15 as mentioned in 3GPP TS 38.321, Section 5.1.3, incorporated herein by reference in its entirety.

Returning to FIG. 3A, per step 314, if the UEe detects at least one RAR with the appropriate RA-RNTI, then it proceeds to step 316 and transmits a single msg3 as scheduled by the RAR.

Figure 3B:
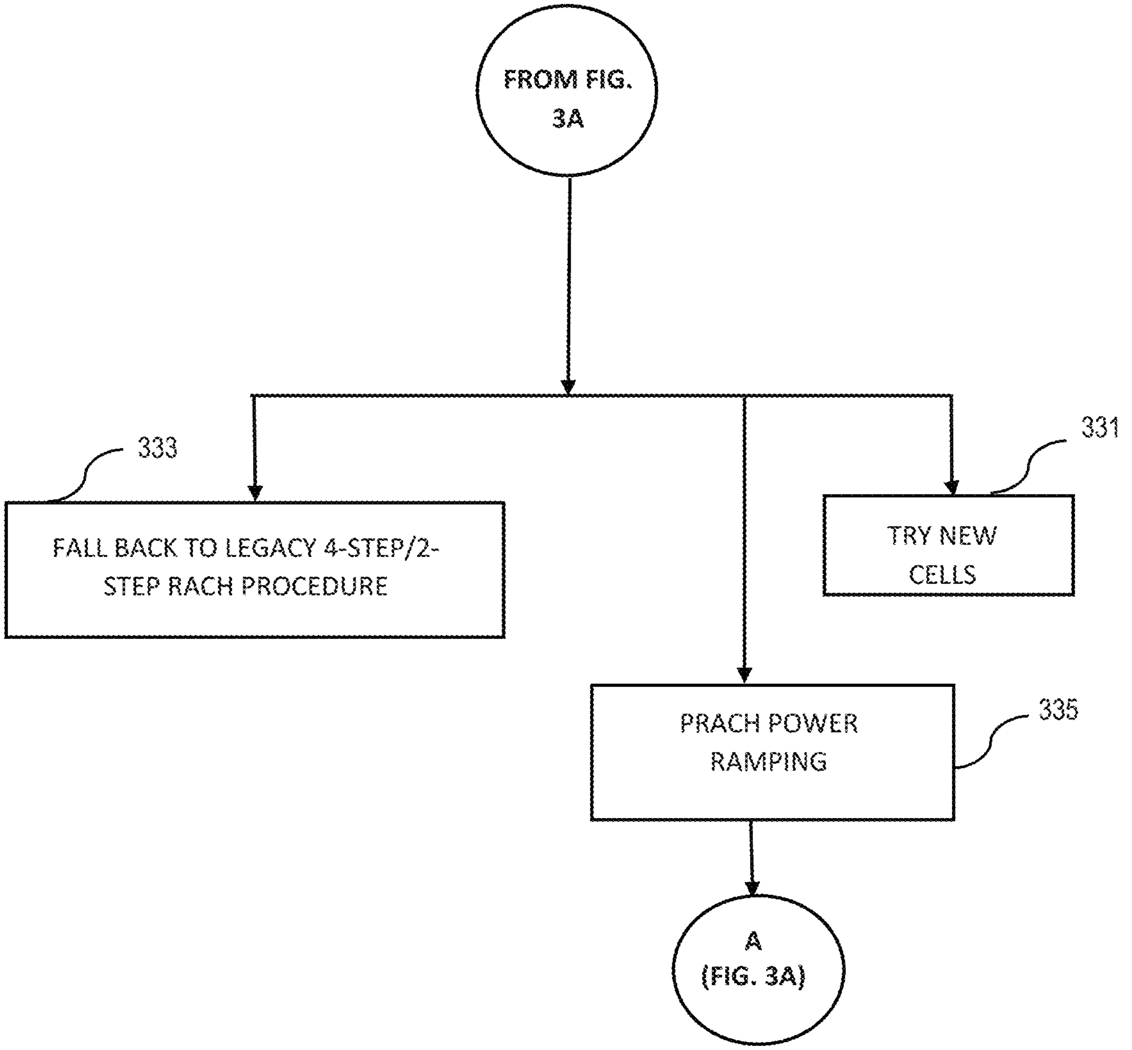

In one configuration, if the UEe does not detect any RARs at step 314, then it either (i) goes back to step 312, with PRACH power ramping for any subset of previously attempted cells, or (ii) may choose to proceed with an alternative implementation as illustrated in FIG. 3B, discussed below.

Figure 1B:
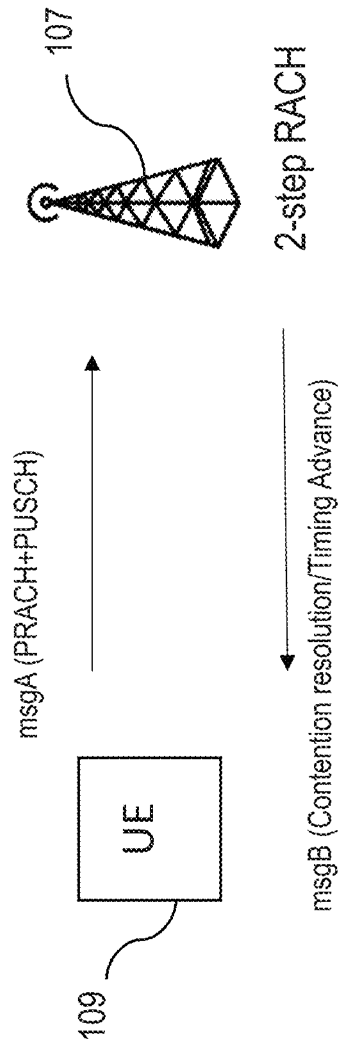
FIG. 1B (Prior Art)
FIG. 1B is graphical illustration of one exemplary prior art approach to RACH (2-step).

As shown in FIG. 3B, the UEe may repeat step 312 with power ramping (step 335), try new cells at step 331, or fall back to legacy single-cell 4-step or 2-step RACH procedure described in FIGS. 1A-1B per step 333.

In one implementation, the UEe performs PDCCH detection on all the PDCCH search spaces for the same RA-RNTI. Alternatively, the UEe may stop PDCCH detection if an e.g., configured number of PDCCHs with RA-RNTI has already been decoded.

The UEe may also be configured to abort the RACH procedures for the cells on which no msg2 is received, thereby conserving resources and reducing latency. For these cells, the UEe in one approach does not perform any further PDDCH monitoring, and in case of expiry of the corresponding RAR-window, no re-transmission of msg1 for those procedures is performed.

Referring back to FIG. 3A, if the UEe detects multiple RARs with appropriate RA-RNTIs, then it proceeds to step 316.

In the event that multiple RARs that schedule UL grants from different cells are received in step 314 of FIG. 3A, the UEe determines how to transmit msg3 on the PUSCH. It is noted that Release 15 NR does not support multiple dynamic UL grants for PUSCH in the same slot. Accordingly, in one variant, the UEe selects only one of the multiple UL grants for transmission of msg3 to one of the cells, based on one or more of the following criteria: (i) the resource size of the UL grant being large enough for the UEe's msg3 transmission; (ii) the scheduled UL transmission time for msg3 is the shortest available; (iii) the UL LBT category indicated for msg3 (in the case of unlicensed spectrum with LBT protocols); and/or (iv) the operating frequency or E-UTRA Absolute Radio Frequency Channel Number (EARFCN) (e.g., lower frequency for better coverage or the higher frequency for capacity).

If a common RAR window is chosen for all the RACH procedures, the UEe may alternatively wait until expiration of the RAR-window to decide to respond to which RAR. In the case where the UEe transmits msg3 on its selected UL grant and does not receive msg4 before at least one of the remaining UL grants becomes invalid, it may transmit msg3 on one or more of the remaining valid UL grants based on the above criteria.

In another variant, the UEe transmits msg3 on multiple or all of the received UL grant for maximum reliability (e.g. Ultra-Reliable Low Latency Communication (URLLC)).

Further, depending on the particular application and configuration of the system, the UE may employ various logical flows. For example. if the multiple UL grants are for the same UL slot, then depending upon the UEe capability, it either (i) transmits on all of them, or (ii) chooses one grant based on e.g., one or more of the above criteria.

Note also that in another scenario, the core network (AMF—see FIG. 1) may reject multiple connection requests from the same UEe ID (IMSI), and hence the UEe attaches to only one cell.

As another alternative, the network may be configured to use inter-cell signalling (e.g., over the Xn interface) such that one or more accepting cell(s) indicate acceptance to all participating cells (or prescribed subsets thereof). Then, based on a pre-defined cell hierarchy (such as one that is imposed via OAM), one or more of the accepting cells lower in the hierarchy secede.

Further, in another variant, if the UEe is allowed to complete an RRC_CONNECTION with multiple cells, then it may request RRC_CONNECTION release to extraneous cells, and continue with only one cell. Selection of the one cell to retain may be based on any number of criteria, including one or more of those listed above, or yet others that will be appreciated by those of ordinary skill given the present disclosure.

Unlicensed/LBT Variants

Figure 6:
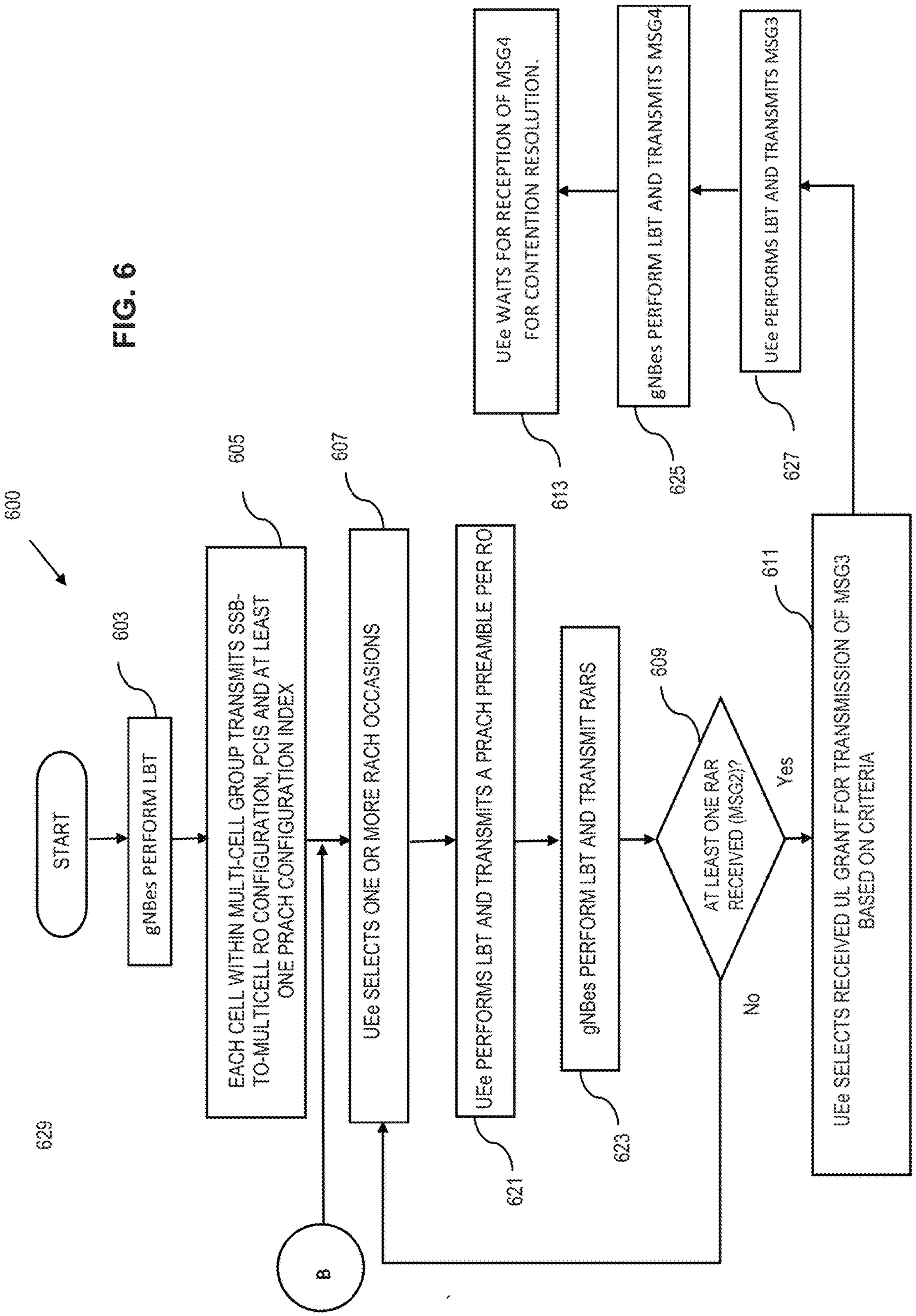
FIG. 6 is logical flow diagram illustrating one exemplary implementation of a connection procedure for multiple cells simultaneously based on a 4-step RACH protocol, according to the present disclosure.

FIG. 6 is a flowchart illustrating an exemplary embodiment of a method 600 according to the present disclosure, wherein a UEe connects to multiple cells simultaneously in an unlicensed band. For unlicensed spectrum deployments, each of the transmission steps described in the methodology of FIGS. 3-3B may be preceded by a listen-before-talk (LBT) operation. Hence, the presence of the LBT operations provides both additional complexity and latency, but also additional opportunities for further optimization (including aggregation of processes) as discussed below.

In the embodiment shown in FIG. 6, the method 600 is based generally on the 4-step RACH of the type previously described. This methodology is described in the exemplary context of the 3GPP-based RA procedure referenced herein, although it will be appreciated that it may be adapted to other procedures and applications by those of ordinary skill given the present disclosure.

For unlicensed spectrum, as it is shown in FIG. 6, each step 311, 312, 314, 316, in FIG. 3A is preceded by a Listen-Before-Talk (LBT) operation. Specifically, an LBT procedure may be invoked at steps 621, 627 at the UEe before the transmission of msg1 and msg3, and at steps 623 and 625 at the gNBe(s) before the transmission of msg2 and msg4. Also, the gNBe at each cell may perform an LBT procedure at step 629 before the transmission of SSB-to Multicell RO. In one variant, an LBT mechanism based on carrier sense, energy detection or correlation (e.g., using a CAZAC sequence such as Zadoff-Chu to affirmatively detect use of the channel by e.g., an LTE-LAA/U device such as via a P-SS synchronization signal), or other mechanism is used. By way of another example, preamble or other known pattern detection may also be utilized.

In the exemplary case of NR-U, the UEe may respond with msg3 to each of the received RARs when the provided grant is within the same gNBe-initiated COT (channel occupancy time), unless msg4 is already received for a previously-sent msg3. If the provided grant for msg3 is outside of the gNBe-initiated COT (or if the UEe is unable to prepare msg3 on time to be sent within the COT), the UEe may send msg3(s) in the first occasion where the LBT clears.

Figure 7:
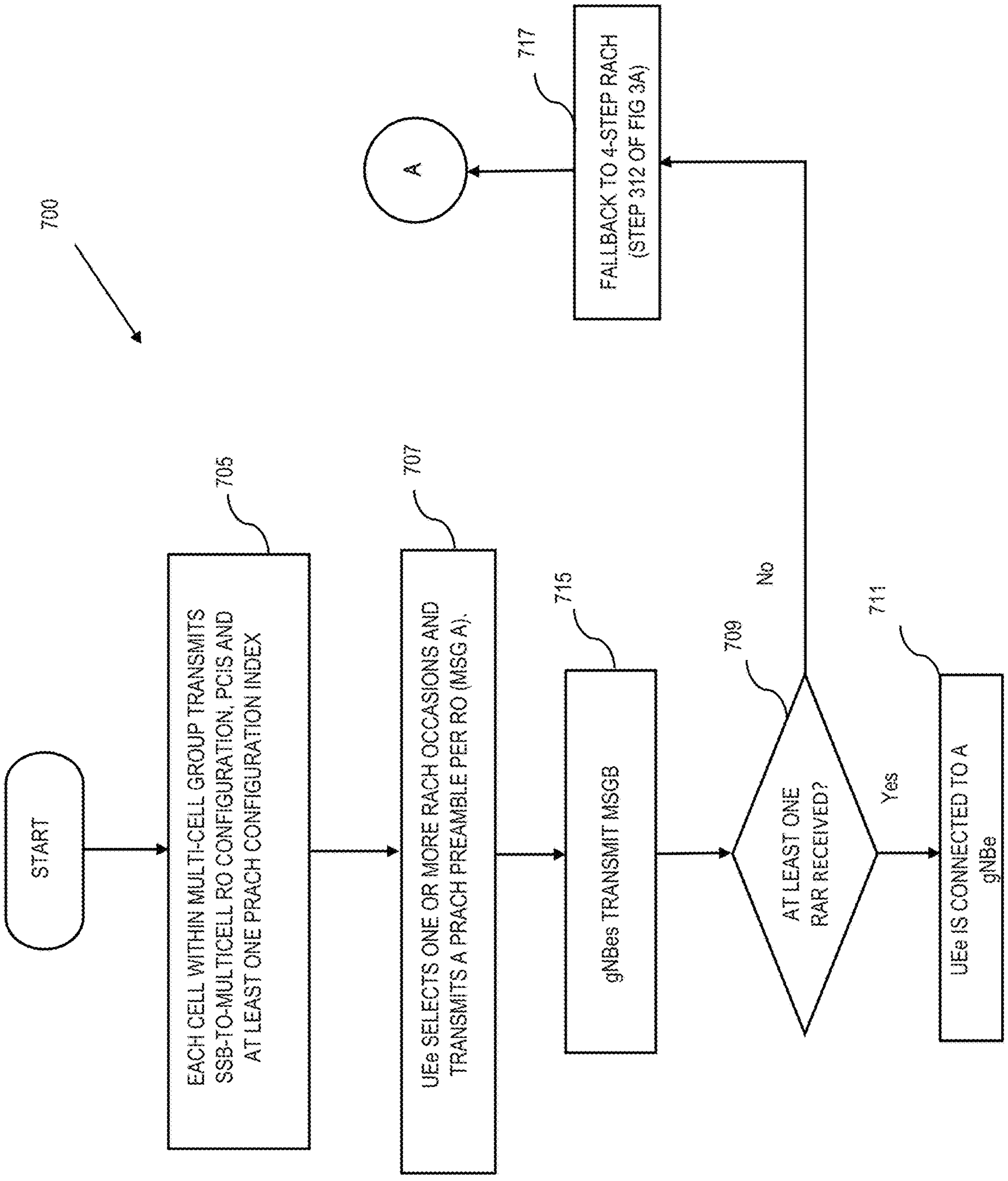
FIG. 7 is logical flow diagram illustrating one exemplary implementation of a connection procedure for multiple cells simultaneously based on a 2-step RACH protocol, according to the present disclosure.

FIG. 7 is a flowchart illustrating an exemplary embodiment of a method 700 according to the present disclosure, wherein a UEe connects to multiple cells simultaneously based on the 2-step RACH previously described. Again, this methodology is described in the exemplary context of the 3GPP RA procedure referenced herein, although it will be appreciated that it may be adapted to other procedures and applications by those of ordinary skill given the present disclosure.

Per step 705, each cell (gNBe) within the multi-cell group transmits SSB-to-multicell RO configuration data, PCI data, and at least one PRACH configuration index.

Per step 707, the UEe selects one or more RACH occasions based on either SSB or Channel State Information Reference (CSI-RS) Signal, and transmits a PRACH preamble per RO (msgA). As previously noted, a separate RO in a different UL Bandwidth Part (BWP) may be used for each cell in the most general case. Alternatively, the ROs maybe in the same slot but spread across different time-domain locations (e.g., in consecutive time slots), or the ROs maybe in the same time slot but spread across different frequency domain locations (up to 8). As a special case, the ROs of the different cell may overlap partially or completely in time-frequency resources. In this case, the same msg1 with the same PRACH format is received by the multiple cells in the group.

Next, per step 715, the gNBes at each cell transmit msgB to the UEe.

Per step 709, the UEe waits until one or more RARs (msgB) is received, and detects a PRACH preamble on their respective PDCCHs. If the UEe successfully receives at least one RAR, it aborts the RACH procedure, and proceeds to step 711. If no RAR is received, then the UEe proceeds to step 717, and falls back to 4-step RACH, such as that described with respect to FIG. 3A.

Figure 8:
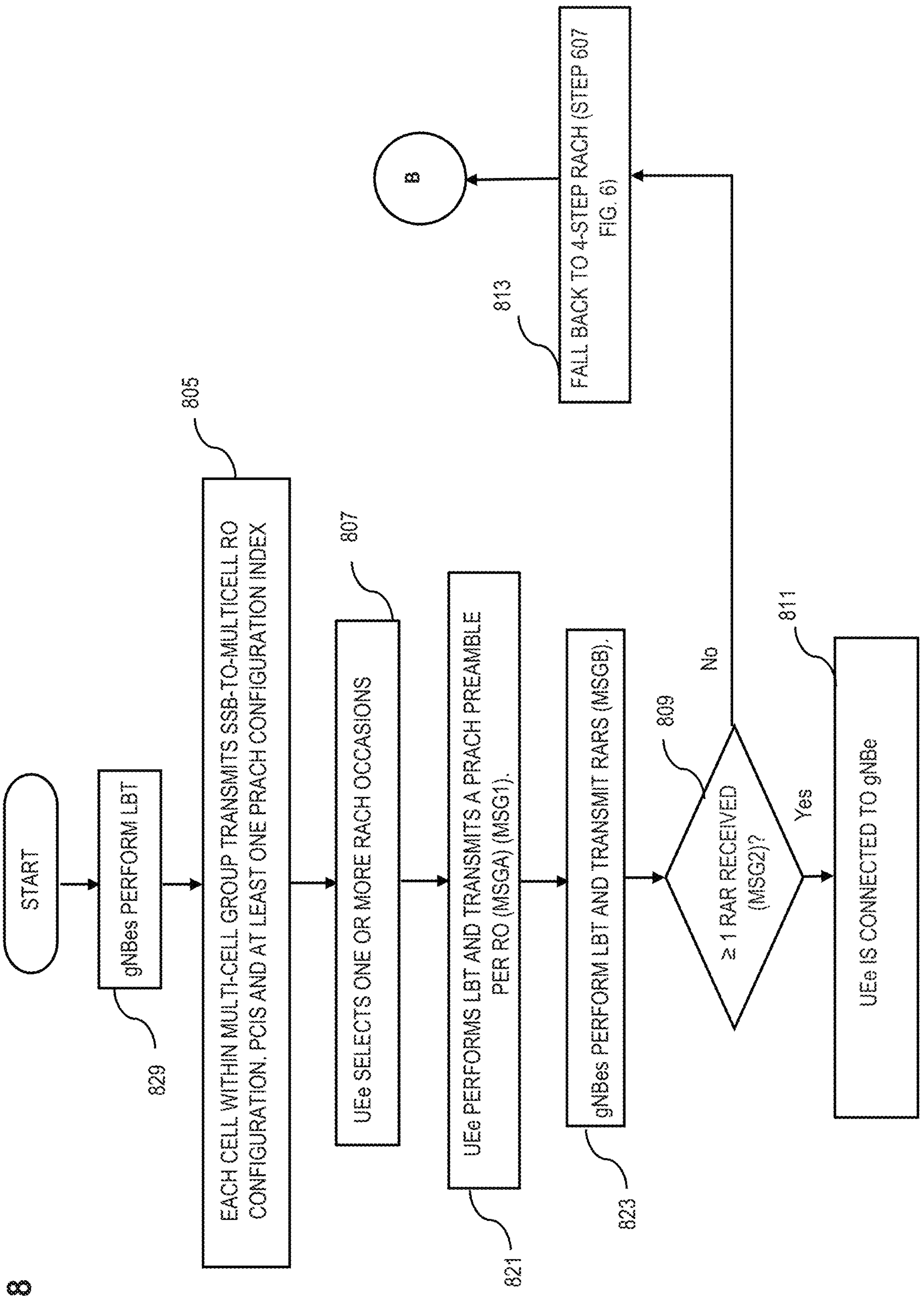
FIG. 8 is logical flow diagram illustrating another exemplary implementation of a connection procedure for multiple cells simultaneously based on a 2-step RACH protocol, according to the present disclosure.

FIG. 8 is a flowchart illustrating an exemplary embodiment of a method 800 for a UE connecting to multiple cell simultaneously in unlicensed band, based generally on the 2-step RACH previously described. As before, this methodology is described in the exemplary context of the 3GPP RA procedure referenced herein, although it will be appreciated that it may be adapted to other procedures and applications by those of ordinary skill given the present disclosure.

For unlicensed spectrum, as shown in FIG. 8, each step 705, 707, and 715 of the methodology of FIG. 7 is preceded by a Listen-Before-Talk (LBT) operation. An LBT procedure may be invoked at step 821 at the UEe before the transmission of msgA and at step 823 at the gNBe(s) before the transmission of msg2. Also, the gNBes at each cell may perform and LBT procedure at step 829 before the transmission of SSB-to Multicell RO. In one variant, an LBT mechanism based on carrier sense, energy detection or correlation (e.g., using a CAZAC sequence via a P-SS synchronization signal, preamble or other known pattern detection, or other approach is used.

It will also be appreciated that while unlicensed and licensed variants are described above, a given UEe may be able to operate under both paradigms (e.g., NR and NR-U), and may in fact switch between them based on e.g., availability of access, cost, UEe location, and other factors. Hence, the foregoing exemplary methods may be readily adapted to accommodate "hybrid" use cases, such as where the UEe first attempts access on a licensed spectrum gNBe, and then falls back to an unlicensed gNBe access attempt (or vice versa). As such, certain portions of the methods may be obviated and/or reordered as required to accommodate these types of hybrid use cases.

Example Implementations

The foregoing methods can advantageously be implemented in a number of different embodiments and configurations, depending on the use context and the functionality desired within a particular application. The following give exemplary specific implementations of the methods discussed above for purposes of further illustration.

1) Implementation 1—

In a first implementation, the methods and apparatus described herein are adapted to the context of the extant 5G NR 4-step RACH process for initial access. In this embodiment, an enhanced UE (UEe) implements a three-tier process.

In the first tier, the UEe first selects one or more RACH occasions (ROs) based on either SSBs or CSI-RS, and transmits a PRACH preamble per RO. It is noted that a separate RO in a different UL Bandwidth Part (BWP) may be used for each different cell 205, 206, 209, in the most general case. Otherwise, the ROs may be in the same UL BWP, but be spread across different time-domain locations; e.g., in consecutive slots. Alternatively, the ROs may be in the same slot but spread across different frequency-domain locations (for instance, up to eight (8) locations in frequency are supported in NR Rel-15).

Moreover, as a special case, the ROs of the different cells may overlap partially or completely in time-frequency resources, in which case the same transmission (i.e., msg1 in FIG. 2A) with the same PRACH format is received by all three cells.

In the existing NR RACH procedure, an SSB-to-RO mapping configuration is broadcast on a per-cell basis, and a UE's choice of a given RO depends upon the best SSB (e.g., highest Reference Signal Received Power or RSRP) of that cell that it measures. In various implementations of the present disclosure, in order to avoid spending time on detecting and measuring SSBs and Remaining Minimum System Information, or RMSI from different cells, the broadcast SSB-to-RO mapping configuration indicated in RACH-ConfigCommon in SIB1 is enhanced to a SSB-to-multi-cell RO mapping configuration, either by OAM configuration or SON (self-organizing network) functionality, and an additional 1-bit flag may be set within system information (e.g., SIB1) to enable multi-cell RACH. Notably, since FR1 (frequency range 1) has a limited number of SSB beams, the complexity of this approach is reduced compared to e.g., FR2 which has higher numbers. In the former case, the UEe has to detect and measure SSBs and DL path loss of only one cell to determine the multi-cell RO(s) and Msg1 Tx power.

In one configuration, if different ROs are used for each different cell, then the PRACH configuration indices that indicate time-frequency occurrences of each RO of each cell are indicated by higher-layer signaling in RACH-Config- Generic IE per cell, as exemplified below for three cells (see discussion of FIGS. 4-5 above):

```
RACH-ConfigGeneric ::=            SEQUENCE {
prach-ConfigurationIndexA           INTEGER (0..255),
prach-ConfigurationIndexB           INTEGER (0..255),
prach-ConfigurationIndexC           INTEGER (0..255),
```

Alternatively, a common PRACH configuration index (configured by OAM) can be signalled for the three cells, and different PRACH occasions within a PRACH slot are used for different Msg1 transmissions.

For e.g., short preamble sequences of length 139 support multiple PRACH transmission occasions per PRACH slot in Rel-15, where the PRACH slot is determined based on the PRACH configuration index.

Next, as part of the second tier, the cells that successfully detect the PRACH preamble described above send a Random Access Response (RAR or msg2) on their respective PDCCHs. It is not necessary for the cells to distinguish between a multi-cell RACH procedure or conventional RACH procedure at this point.

To find the DCI(s) format 1_0 scrambled with RA-RNTI that schedules the RAR(s) on the DL, the UEe needs to know the associated DL BWP, PDCCH search space parameters and CORESET ID.

Under Rel-15, a UE must be capable of monitoring a separate PDCCH per cell in potentially separate Type-1 PDCCH common search spaces (up to three CSSs in this example). Each cell would need to broadcast the Type-1 search space configurations of multiple cells. Notably, a similar capability already exists within Rel-16 NR, wherein a UE can receive PDCCHs from different TRPs in the same slot.

As an enhancement, the network may configure multi-cell RACH with overlapping/common initial DL active BWPs for the multiple cells, then a single BWP with non-overlapping search spaces may be monitored by the UE for the RARs without DL BWP switching, which is less complex. The PCIs of all cells are indicated by each cell as part of RACH-ConfigGeneric to enable cell-ID based slot descrambling.

The RA-RNTI derivation (see 3GPP TS 38.321 Sec. 5.1.3, incorporated herein by reference in its entirety) remains the same as Rel-15, since the UEe knows when it transmitted the PRACH preamble(s). Either a common or per-cell RA-responsewindow size may be applied by the UEe in which to try and detect the RARs.

If the UEe does not detect any RARs, then it either (i) repeats the first process above with PRACH power ramping for any subset of previously-attempted cells, or (ii) may choose new cells, or (iii) falls back to legacy single-cell 4-step/2-step RACH.

If the UEe detects only a single RAR with the appropriate RA-RNTI, then the remainder of the procedure is consistent with existing 4-step RACH (i.e., transmit a single Msg3 as scheduled by the RAR and wait for Msg4).

The UEe performs PDCCH detection on all the PDCCH search spaces for the same RA-RNTI. Alternatively the UEe may stop PDCCH detection if a configured number of PDCCHs with the RA-RNTI have already been decoded.

The UEe may also be configured to abort the RACH procedures for cells on which no msg2 has been received to that point (and if so no further PDCCH monitoring is performed and in case of expiry of the corresponding RAR-window, no retransmission of msg1 for those procedures is performed).

If the UEe detects multiple RARs with appropriate RA-RNTIs, then the UEe proceeds to the third tier of the process, wherein the UEe must determine how to transmit msg3 on PUSCH. It is noted that multiple dynamic UL grants for PUSCH within the same slot is not supported in Rel-15 NR.

Hence, in one configuration, the UEe selects only one of the multiple UL grants for transmission of Msg3 to one of the cells, based on one or more criteria. For example, in one variation, one or more of the following criteria are utilized as a basis for the aforementioned selection: (i) the resource size of the UL grant being large enough for the UEe's Msg3 transmission; (ii) the scheduled UL transmission time for msg3 being the shortest (for quickest access); (iii) the UL LBT category (for example, no UL LBT is preferred) indicated for msg3 in the case of unlicensed spectrum; and/or (iv) the operating frequency/EARFCN of the cell; for example, lower frequency for better coverage or higher frequency for capacity.

If a common RAR-window is chosen for all the RACH procedures, the UEe may alternatively wait until expiration of the RAR-window to decide which of the multiple RAR to respond to.

If the UE transmits msg3 on its selected UL grant and does not receive msg4 before at least one of the remaining UL grants becomes invalid, it may transmit msg3 on one or more (up to a configured number) of the remaining valid UL grants based on the above criteria.

Notably, the UEe may be configured to transmit msg3 on multiple or all of the received UL grants for maximum reliability, for instances such as where the UEe requires URLLC (ultra-reliable low-latency communication) services.

In the instance where the received multiple UL grants are for the same UL slot, then depending upon the UEe capability it either transmits msg3 on all grants or chooses one grant based on the above criteria.

One possible outcome of multiple transmission of msg3 is that the core network (AMF—see FIG. 1) may reject multiple connection requests from the same UE ID (IMSI), and hence the UEe attaches to only one cell.

Alternatively, inter-cell signaling over Xn such that accepting cell(s) indicate acceptance to all participating cells, may be used. In one variant thereof, based on a pre-defined cell hierarchy (via OAM), the accepting cells lower within the hierarchy secede.

If the UE is allowed to complete RRC_CONNECTION with multiple cells, then it may request RRC_CONNECTION release from extraneous cells and continue with only one cell.

2) Implementation 2—

For unlicensed spectrum deployments, each of the transmission steps in Implementation 1 discussed above may be preceded by a listen-before-talk (LBT) operation. For example, the LBT procedures for msg1/msg2/msg3/msg4 may be based on existing procedures as defined in Rel-16 NR-Unlicensed (NR-U) for FR1. For enhanced efficiency, the multiple msg1 transmissions as described above in Implementation 1 may be conducted in consecutive PRACH occasions (e.g., without gaps), such that only a single UL LBT process is required for all.

In case of NR-U, the UEe may respond with msg3 to each of the received RARs when the provided grant is within the same gNBe-initiated COT, unless msg4 is already received for a previously-sent msg3. If the provided grant for msg3 is outside of the gNB e-initiated COT (or if the UEe is unable to prepare msg3 on time to be sent within the COT), the UEe may send msg3(s) in the first occasion after LBT clears.

For NR 2-step RACH, the procedure includes msgA transmission (per the first tier of the process discussed above), followed by msgB transmission per the second tier as described above.

The UEe may wait until one or more msgB successRAR elements is received, in which case the UEe may abort the RACH procedures for which a msgB fallbackRAR element (fallback to 4-step RACH) is received. If no msgB successRAR element is received (i.e. only msgB fallbackRAR is received for some or all of the transmitted msgA), then the UEe proceeds according to second tier.

For LTE, the msg1 transmission process is functionally equivalent to a single-SSB scenario in first tier; i.e., SSB-to-RO mapping is not required, and signaling the PRACH configuration indices and PCIs is sufficient.

User Apparatus—

Figure 9:
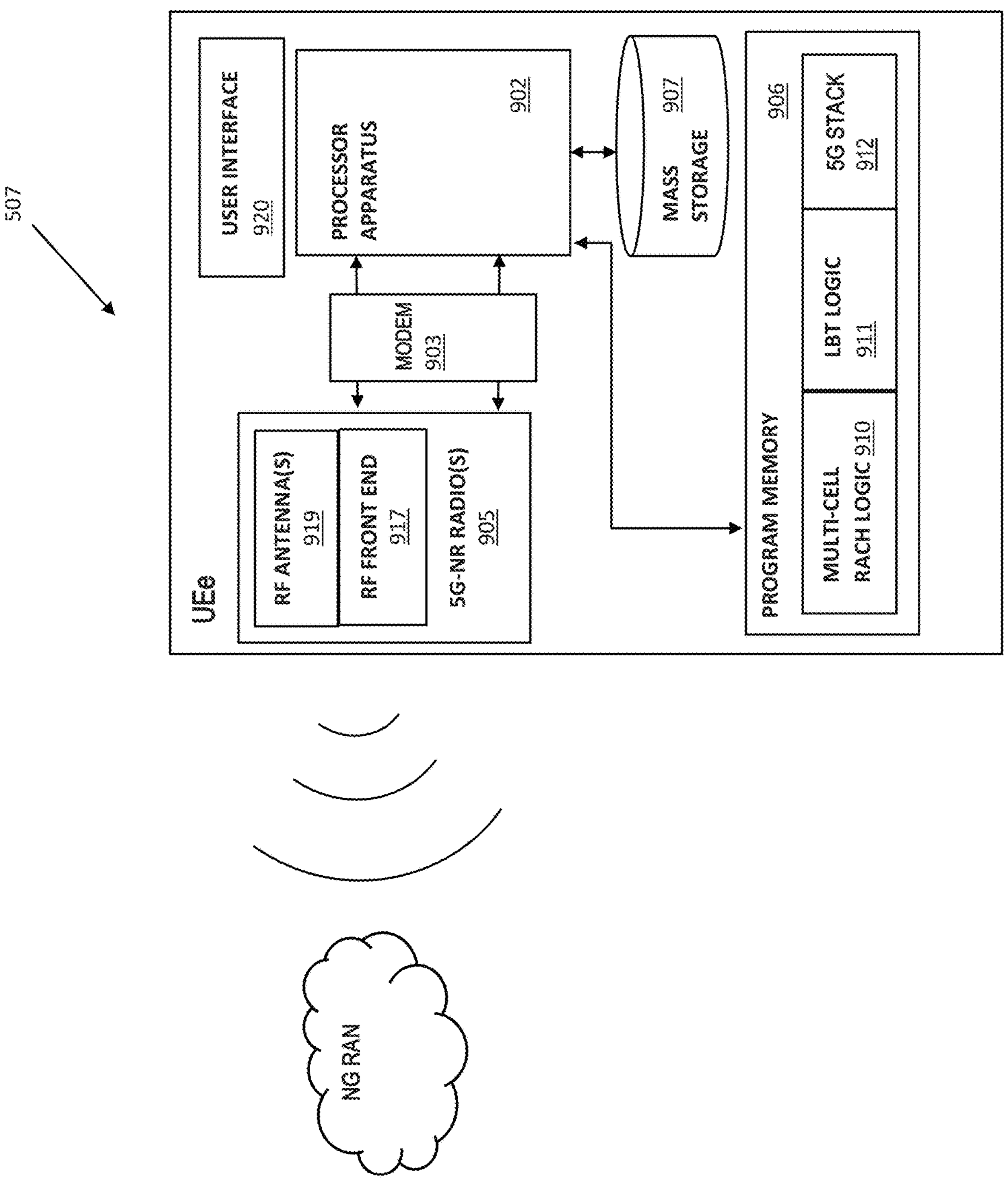
FIG. 9 is functional block diagram illustrating one embodiment of a client device (e.g., UEe or user equipment such as a mobile device) according to the disclosure.

FIG. 9 illustrates a block diagram of an exemplary embodiment of an enhanced user apparatus (e.g., 3GPP-based UEe) 207, useful for operation in accordance with various aspects of the present disclosure.

In one exemplary embodiment as shown, the UEe 207 includes, inter alia, a processor apparatus or subsystem 902 (including a baseband processor or modem), a program memory module 906, UE LBT logic 911 (here implemented as software or firmware operative to execute on the processor 902), and wireless radio interface 905 for communications with the relevant RANs (e.g., 5G-NR RAN). An LTE radio (not shown) may also be used within the device, such as to support dual connectivity (DC) modes of operation, and a MUSIM (multi-SIM) configuration may also be used such that he UEe can connect with multiple different PLMNs or the same PLMN using different credentials.

The RF interface(s) 917 is/are each configured to comply with the relevant PHY standards which it supports. The antenna(s) 919 of the UEe radios may include multiple spatially diverse individual elements in e.g., a MIMO- or MISO-type configuration (including so-called Massive MIMO or mMIMO), such that spatial diversity of the received signals can be utilized. Moreover, a phased array or similar arrangement can be used for spatial resolution within the environment, such as based on time delays associated with signals received by respective elements. Spatial multiplexing may also be utilized within the UEe 207, such as to enhance data rate (as contrasted with increase in coverage area typically afforded via spatial diversity).

In one embodiment, the processor apparatus 902 may include one or more of a digital signal processor, microprocessor, field-programmable gate array, GPU, or plurality of processing components mounted on one or more substrates. The processor apparatus 902 may also comprise an internal cache memory, and modem 903. As indicated, the exemplary configuration of the UE includes an LBT module 911, and Multi-Cell RACH logic 910 on the program memory which is in communication with the processing subsystem, where the former may include memory which may comprise, e.g., SRAM, flash and/or SDRAM components. The memory module 906 may implement one or more of direct memory access (DMA) type hardware, so as to facilitate data accesses as is well known in the art. The memory module of the exemplary embodiment contains one or more computer-executable instructions that are executable by the processor apparatus 902. A mass storage device (e.g., HDD or SSD, or NAND/NOR flash or the like, such as via eMCC) is also provided as shown.

Other embodiments may implement the LBT and Multi-Cell RACH functionality within dedicated hardware, logic, and/or specialized co-processors (not shown).

As noted, the UEe 207 may include an LBT module 911 which is configured to determine the availability of unlicensed frequency spectrum. In one embodiment, the LBT module measures the channel parameters in the unlicensed spectrum, determine the availability of unlicensed frequency band. The LBT logic is in communication with the modem 903 (via its execution on the processor) regarding the availability of unlicensed spectrum. The modem 903 processes the basedband control and data signals for transmission and reception in the RF frond end module 917.

The UEe 207 of FIG. 9 also include a Multi-Cell RACH module 910 which is configured to perform RA procedure on multiple cells. In one embodiment, the Multi-Cell RACH module uses a 4-step RA process to connect to the multiple cells simultaneously. The Multi-Cell RACH logic is in communication with the modem 903 (via its execution on the processor) regarding the availability of unlicensed spectrum. The modem 903 processes the baseband control and data signals for transmission and reception in the RF frond end module 917.

In some embodiments, the UEe also utilizes memory 906 or other storage 907 configured to temporarily hold a number of data relating to the various network associations (e.g., cells or xNBes which the UEe has associated with under the multi-cell procedures described herein), and for the various supported services/applications such as voice, etc. In other embodiments, application program interfaces (APIs) such as those included in an MSO-provided application or those natively available on the use may also reside in the internal cache or other memory 906. Such APIs may include common network protocols or programming languages configured to enable communication with the UEe 207 and other network entities.

Wireless Access Node Apparatus—

Figure 10:
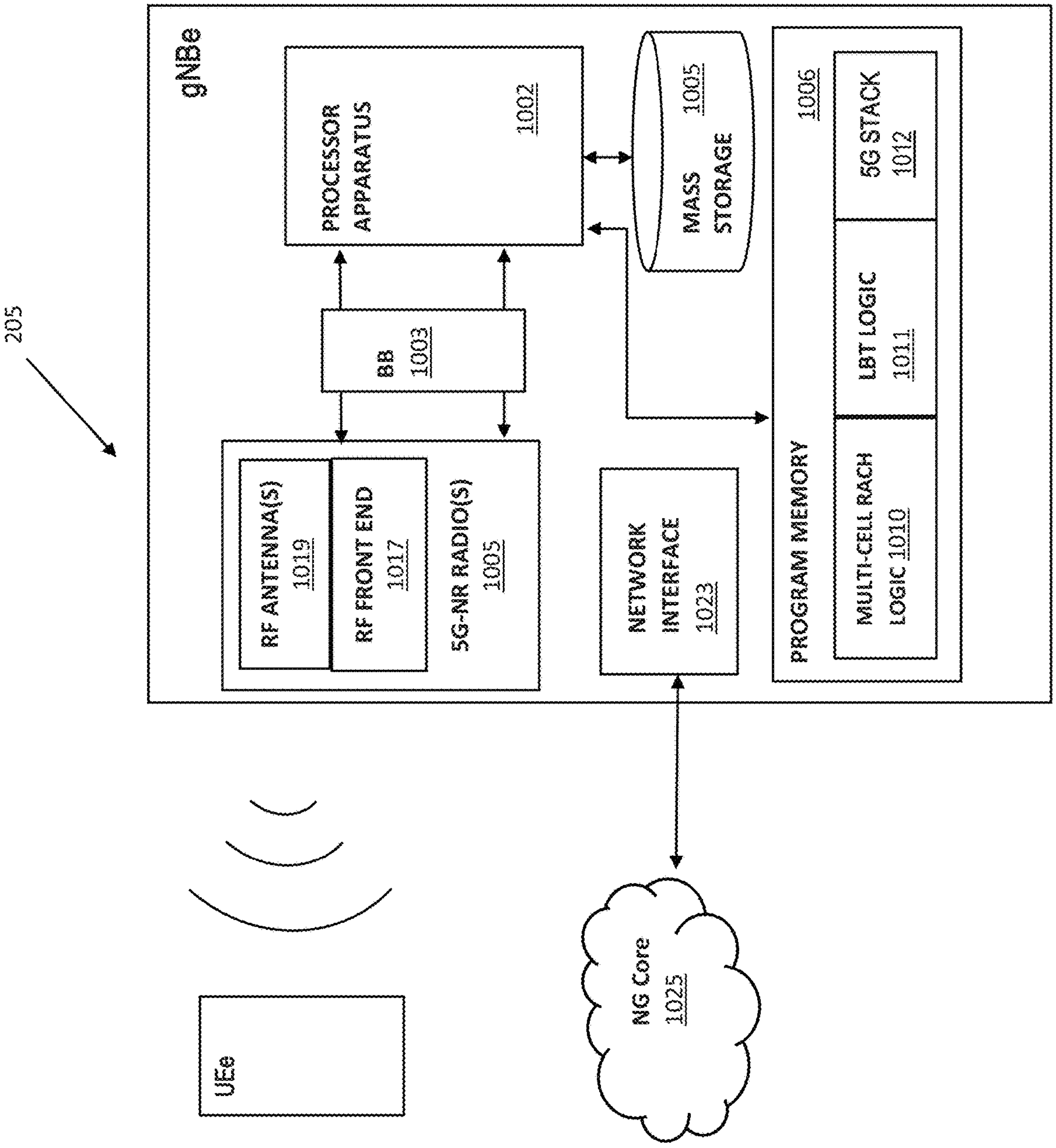
FIG. 10 is functional block diagram illustrating one embodiment of a wireless access node (e.g., 5G NR compliant gNBe) according to the disclosure.

FIG. 10 illustrates a block diagram of an exemplary embodiment of a wireless access node (e.g., 3GPP 5G-enabled gNBe) apparatus 1000, useful for operation in accordance with the present disclosure.

In one exemplary embodiment as shown, the gNBe includes, inter alia, a processor apparatus or subsystem 1002, a program memory module 1006, a local database 1005, and wireless interfaces 1023 for communications with the relevant UEs and UEes (e.g., via 4G/4.5G E-UTRAN and 5G-NR RAN infrastructure of which the gNBe is part).

The 5G RF interface 1005 may be configured to comply with the relevant PHY according to the relevant 3GPP NR standards which it supports (e.g., NR-U). The antenna(s) 1019 of the radios of the gNBe(s) may include multiple spatially diverse individual elements in e.g., a MIMO- or MISO-type configuration (including so-called Massive MIMO or mMIMO), such that spatial diversity of the received signals can be utilized. Moreover, a phased array or similar arrangement can be used for spatial resolution within the environment, such as based on time delays associated with signals received by respective elements. Similar to the UEe previously described, spatial multiplexing may also be utilized with the gNBe.

In one embodiment, the processor apparatus 1002 may include one or more of a digital signal processor, microprocessor, baseband (BB) processor, field-programmable gate array, or plurality of processing components mounted on one or more substrates. The processor apparatus 1002 may also comprise an internal cache memory, and modem 1003. In addition, the gNBe may include an LBT module 1011 and a Multi-Cell RACH module 1010 on the program memory which is in communication with the processing subsystem. In one example, the LBT and Multi-Cell RACH module maybe implemented in the gNBe as software or firmware stored on a storage device and executed on the processor 1002.

The processing subsystem 1002 is in communication with a program memory module or subsystem 1006, where the latter may include memory which may comprise, e.g., SRAM, flash and/or SDRAM (e.g., GDDR5 or GDDR6) components. The memory module 1006 may implement one or more of direct memory access (DMA) type hardware, so as to facilitate data accesses as is well known in the art. The memory module of the exemplary embodiment contains one or more computer-executable instructions that are executable by the processor apparatus 1002. A mass storage device (e.g., HDD or SSD, or NAND/NOR flash or the like) is also provided as shown.

The processor apparatus 1002 is configured to execute at least one computer program stored in memory 1006 (e.g., the logic of the Multi-Cell RACH module according to the methods of FIGS. 3-3*b* and 6-8 herein, in the form of software or firmware that implements the various functions). Other embodiments may implement such functionality within dedicated hardware, logic, and/or specialized co-processors (not shown).

In some embodiments, the logic 1010, and 1011 also utilizes memory 1006 or other storage 1005 configured to temporarily and/or locally hold a number of data relating to the various associations for the various UEe 207 (and other UE) which it services under the NR-U or other standard(s). In other embodiments, application program interfaces (APIs) may also reside in the internal cache or other memory 1006. Such APIs may include common network protocols or programming languages configured to enable communication between with other network entities (e.g., via API "calls" to or from the NG Core).

Service Provider Network

Figure 11:
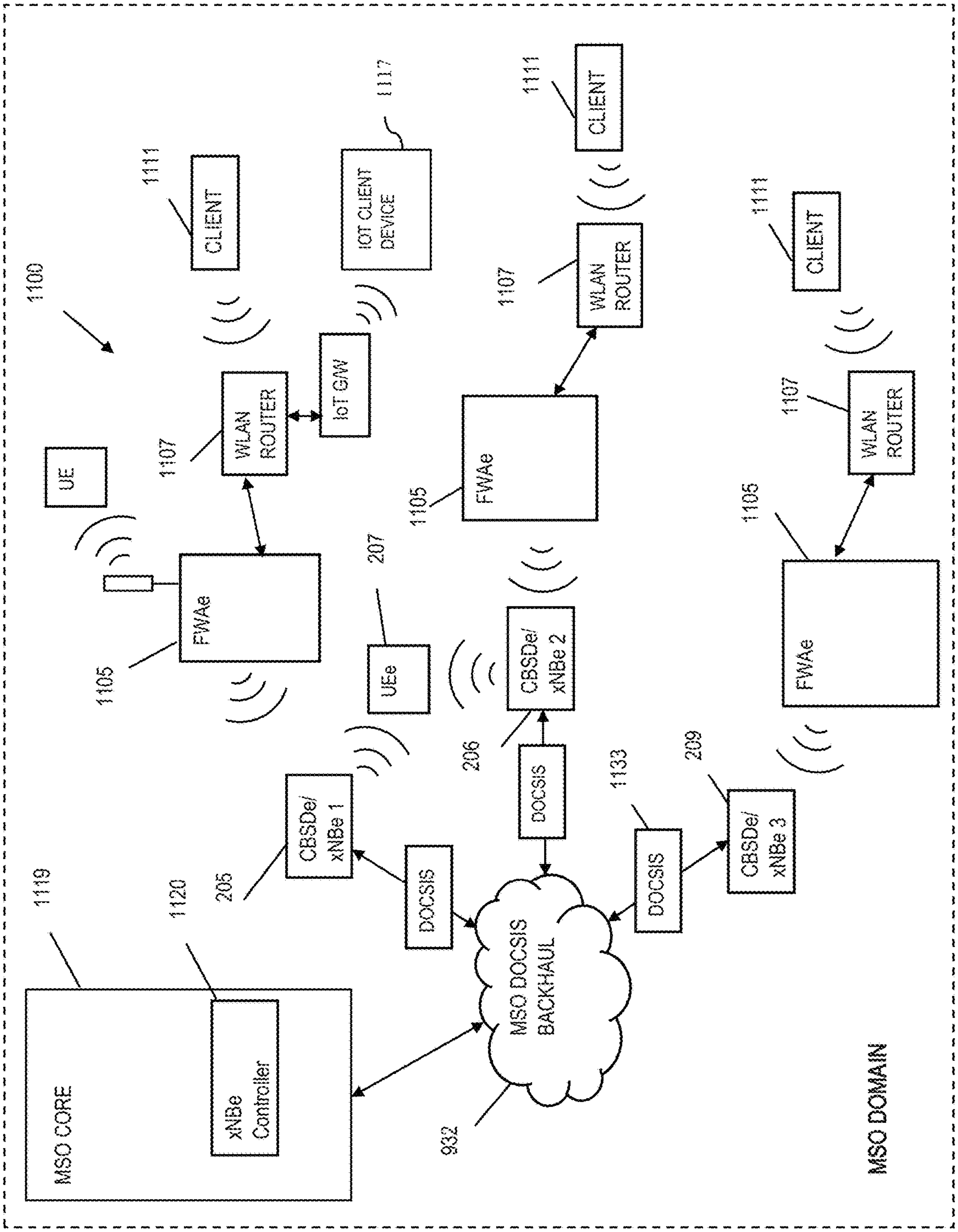
FIG. 11 is a functional block diagram of a first exemplary MSO network architecture useful in conjunction with various principles described herein.

FIG. 11 illustrates a typical service provider network configuration useful with the features of the apparatus and methods described herein. It will be appreciated that while described with respect to such network configuration, the methods and apparatus described herein may readily be used with other network types and topologies, whether wired or wireless, managed or unmanaged.

The exemplary service provider network 1100 is used in the embodiment of FIG. 11 to provide backhaul and Internet access from the service provider's wireless access nodes (e.g., xNBes or CBSDes based on the multi-cell capable gNBes previously described herein, Wi-Fi APs, and FWA devices operated or maintained by the MSO), and one or more stand-alone or embedded cable modems (CMs) 1133 in data communication therewith.

The individual xNBes 205, 206, 209 are backhauled by the CMs 1133 to the MSO core via e.g., CMTS or CCAP MHAv2/RPD or other such architecture, and the MSO core 1119 includes at least some of the EPC/5GC core functions previously described, as well as an optional xNBe controller process 1120 as shown. The controller process is in one embodiment a network-based server which communicates with the various gNBe within the MSO infrastructure so as to effect various functions including in some cases the logic of FIGS. 3-3B and 6-8 as previously described. The controller 919 can communicate with the xNBes via the primary backhaul The xNBes 205, 206, 209 may also be configured to fail to their internal logic when communication with the network controller process 1120 is lost, in effect self-moderating for decisions of multi-cell modes and operation.

While not shown, it will also be appreciated that the logic of the UEe 207 relating to multi-cell RACH operation may also be communicative with and controlled at least in part by the network controller 1120 in some embodiments, such as via established connections between the UEe and one or more gNBes, or alternatively via another backhaul such as WLAN link.

Client devices 1111, 1112, 1117 such as tablets, smartphones, SmartTVs, etc. at each premises are served by respective WLAN routers 1107, IoT gateways 1113, and CPEe/FWAe 1105, the latter which are backhauled to the MSO core or backbone via their respective xNBes.

Notably, in the embodiment of FIG. 11, all of the necessary components for support of the wireless service provision and backhaul (including multi-cell RA) functionality are owned, maintained and/or operated by the common entity (e.g., cable MSO). The approach of FIG. 11 has the advantage of, inter alia, giving the MSO complete control over the entire service provider chain so as to optimize service to its specific customers (versus the non-MSO customer-specific service provided by an MNO), and the ability to construct its architecture to optimize incipient 5G NR functions such as network slicing, gNBe DU/CU Option "splits" within the CBSDe/xNBe infrastructure, selection or configuration of subsets or groups of gNBe (or their individual DU) which can participate in multi-cell RA connection processes, etc.

Figure 12:
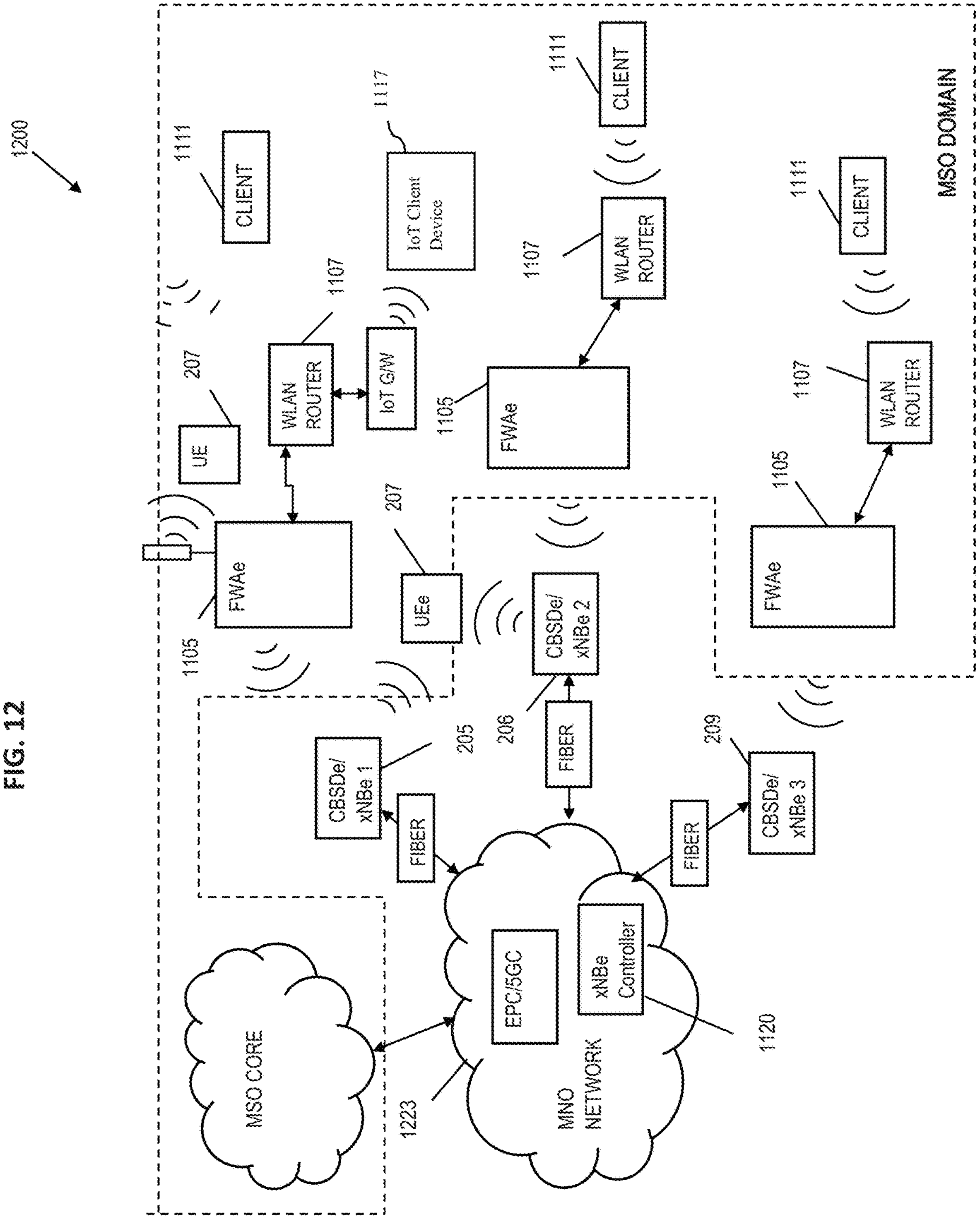
FIG. 12 is a functional block diagram of an exemplary MNO network architecture useful in conjunction with various principles described herein, wherein respective portions of the infrastructure are managed or operated by the MSO and one or more MNOs.

FIG. 12 illustrates the relationship between the MSO architecture of FIG. 11 and an MNO architecture 1200. As shown, the MSO service domain extends only to the CPEe/FWAe and served premises and the MSO core functions, while other functions such as 3GPP EPC/E-UTRAN or 5GC and NG-RAN functionality, as well as gNBe controller functions if utilized, are provided by one or more MNO networks 1232 operated by MNOs, including in some embodiments with which the MSO has a service agreement. In this approach, the controller server 1120 is maintained and operated by the MNO (since the MNO maintains cognizance over the xNBes 205, 206, 209), although this is not a requirement, and the present disclosure contemplates embodiments where the controller function is maintained by the MSO or even a third party. The approach of FIG. 12 (i.e., coordination of MSO and MNO networks) has the advantage of, inter alia, avoiding more CAPEX by the MSO, including duplication of infrastructure which may already service the area of interest, including reduced RF interference due to addition of extra (and ostensibly unnecessary) xNBs or other transceivers.

It will also be recognized that within the NR architecture (and constituent NG-RAN), multiple mechanisms exist for identification and management of various entities and processes, including UE and cells.

As a brief aside, a number of different identifiers are used in the NG-RAN architecture, including those of UEs and for other network entities. Specifically (and by way of example only): (i) the AMF Identifier (AMF ID) is used to identify an AMF (Access and Mobility Management Function); (ii) the NR Cell Global Identifier (NCGI), is used to identify NR cells globally, and is constructed from the PLMN identity to which the cell belongs, and the NR Cell Identity (NCI) of the cell; (iii) the gNB Identifier (gNB ID) is used to identify gNB s within a PLMN, and is contained within the NCI of its cells; (iv) the Global gNB ID, which is used to identify gNB s globally, and is constructed from the PLMN identity to which the gNB belongs, and the gNB ID; (v) the Tracking Area identity (TAI), which is used to identify tracking areas, and is constructed from the PLMN identity to which the tracking area belongs, and the TAC (Tracking Area Code) of the Tracking Area; and (vi) the Single Network Slice Selection Assistance information (S-NSSAI), which is used to identify a network slice.

Hence, depending on what data is useful to the MNO, MSO or its customers, various portions of the foregoing can be associated and stored to particular gNBe "clients" or their components being backhauled by the MSO network, whether owned by the MSO, MNO, or another entity. These data can also be utilized by e.g., the controller 1120 or another network process in apportioning or controlling multi-cell RA enabled assets within the infrastructure such as based on operational loading of a given gNB e or the network as a whole, UE location relative to the gNBes, subscriber account or subscription level or privileges, presence of other suitable backhauls for the UEe such as WLAN, 5G NR network slicing considerations, and/or yet other factors which will be recognized by those of ordinary skill in the wireless infrastructure arts given the present disclosure.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A computerized user device configured for use within a wireless network and configured for wireless communication with a plurality of wireless access nodes, the computerized user device comprising:

processor apparatus;

wireless interface apparatus in data communication with the processor apparatus and configured to transmit and receive wireless signals in one or more radio frequency (RF) bands; and computerized logic in data communication with the processor apparatus and configured to, when executed, cause the computerized user device to:

receive configuration information;

based on the configuration data, perform a multi-cell broadcast access process configured to attempt access of at least two of the plurality of wireless access nodes simultaneously; and based on receipt, during the multi-cell broadcast access process, of at least two random access response (RAR) uplink (UL) grants from the at least two of the plurality of wireless access nodes, select only one of the at least two RAR UL grants for transmission of a message on a physical uplink shared channel (PUSCH) to only one selected wireless access node of the at least two of the plurality of wireless access nodes, the selection based on one or more criteria.

2. The computerized user device of claim 1, wherein the receipt of the configuration information comprises receipt of multi-cell mapping data indicative of one or more random access occasions.

3. The computerized user device of claim 1, wherein the performance of the multi-cell broadcast access process comprises transmission of data indicative of a Random-Access Channel (RACH) preamble sequence selected by the computerized user device based on the configuration information.

4. The computerized user device of claim 3, wherein the receipt of the at least two RAR UL grants from the at least two of the plurality of wireless access nodes comprises receipt, in Physical Downlink Shared Channel (PDSCH) and via use of at least one selected beam, of data representative of a response to the RACH preamble sequence with data indicative of a random-access response (RAR) uplink (UL) grant, the RAR UL grant enabling the computerized user device and at least one of the plurality of wireless access nodes to establish beam alignment.

5. The computerized user device of claim 1, wherein;

the transmission of the message on the PUSCH comprises transmission of data representative of a message indicative of resources scheduled by at least one of the plurality of wireless access nodes, the resources indicative of which beam should be used; and the computerized logic is further configured to, when executed, cause the computerized user device to:

receive, in Physical Downlink Shared Channel (PDSCH) and via use of the beam, data representative of a confirmation message, the data representative of the confirmation message confirming use of the beam.

6. The computerized user device of claim 1, wherein the computerized user device comprises a Fifth Generation (5G) New Radio Unlicensed (NR-U) UE device configured to perform Listen Before Talk (LBT) procedures as part of communication with a gNB.

7. The computerized user device of claim 1, wherein the one or more criteria comprise a resource size of the selected one of the at least two UL grants being large enough for the transmission of the message.

8. The computerized user device of claim 1, wherein the one or more criteria comprise a scheduled time associated with the selected one of the at least two UL grants for the transmission of the message being a shortest transmission time available.

9. The computerized user device of claim 1, wherein the one or more criteria comprise a UL listen-before-talk (LBT) category indicated by the selected one of the at least two UL grants for the message.

10. The computerized user device of claim 1, wherein the one or more criteria comprise at least one of (i) an operating frequency or (ii) E-UTRA Absolute Radio Frequency Channel Number (EARFCN), associated with the selected one of the at least two UL grants.

11. A method of operating a wireless user device in a wireless network having a plurality of cells, the method comprising:

obtaining configuration information, the configuration information comprising synchronization signal/PBCH block (SSB)-to-multi-cell RACH (Random Access Channel) occasion (RO) mapping configuration data broadcasted from each of the plurality of cells within at least one system information block, wherein the SSB-to-multi-cell RO mapping configuration data within the at least one system information block identifies ROs corresponding to different ones of the plurality of cells and enables a wireless user device to attempt access of at least two of the plurality of cells at least partly in parallel.

12. The method of claim 11, further comprising transmitting at least one random access preamble respectively per at least one RACH (Random Access Channel) occasion (RO), the at least one random access preamble selected by the wireless user device based on the SSB-to-multi-cell RO mapping configuration data.

13. The method of claim 12, further comprising, based on the random access preamble, receiving at least one random access response (RAR) at the wireless user device.

14. The method of claim 12, wherein the transmitting of the at least one random access preamble comprises:

selecting one or more Random Access Channel (RACH) Occasions (ROs);

selecting a random access preamble among a set of pre-defined preambles;

selecting resources to be used in transmitting the selected random access preambles; and transmitting of the selected preamble per the selected one or more ROs using the selected resources.

15. The method of claim 11, wherein the obtaining of the configuration information comprises obtaining the configuration information from a Fifth Generation New Radio (5G NR)-compliant gNB (gNode B).

16. The method of claim 11, wherein the wireless network comprises one of (i) a 3GPP (Third Generation Partnership Project) Long Term Evolution (LTE) compliant network or (ii) a Fifth Generation New Radio (5G NR) compliant network.

17. Computer readable apparatus comprising a non-transitory storage medium, the non-transitory storage medium comprising at least one computer program, the at least one computer program comprising a plurality of instructions which are configured to, when executed on a processing device, cause a computerized user device to:

receive configuration data; and based on the configuration data, perform a multi-cell broadcast access process configured to attempt access of at least two of a plurality of wireless access nodes simultaneously, the multi-cell broadcast access process comprising monitoring a single bandwidth part (BWP) with non-overlapping search spaces for at least one random access response (RAR) without downlink (DL) BWP switching, wherein the monitoring of the single BWP with the non-overlapping search spaces for the at least one RAR without DL BWP switching is based on a multi-cell random-access channel (RACH) configuration having overlapping or common initial DL active BWPs for the plurality of wireless access nodes.

18. The computer readable apparatus of claim 17, wherein the attempt of the access of the at least two of the plurality of wireless access nodes simultaneously is configured to increase a likelihood of the multi-cell broadcast access process being successful on a first attempt, thereby reducing connection latency and enhancing user experience.

19. The computer readable apparatus of claim 18, wherein the multi-cell broadcast access process is implemented within a synchronous deployment with time-synchronized cells of a common public and land mobile network (PLMN).

20. The computer readable apparatus of claim 17, wherein the computerized user device comprises a premises device associated with a managed network operator, the premises device configured to communicate wirelessly with at least one of (i) multiple Citizens Broadband Radio Service Device (CBSD) or (ii) multiple 3rd Generation Partnership Project (3GPP)-compliant node devices, to obtain high-speed data services from the at least one of (i) the multiple CBSDe or (ii) the multiple 3GPP-compliant node devices, and the managed network operator.

21. The computer readable apparatus of claim 17, wherein the computerized user device comprises a fixed wireless access (FWA) apparatus classified as a Category B Citizens Broadband Radio Service Device (CBSD) Citizens Broadband Radio Service (CBRS) device, and is mounted on a premises so as to enable backhaul for wireless local-area network (WLAN) or wireline interfaces within the premises.

22. The computer readable apparatus of claim 17, wherein the performance of the multi-cell broadcast access process comprises:

transmission of at least one random access preamble to the at least two of the plurality of wireless access nodes;

based on the transmitted at least one random access preamble, receipt of the at least one random access response (RAR) sent from each of the at least two of the plurality of wireless access nodes;

selection of at least one of the received RARs; and transmission of a message to one of the at least two of the plurality of wireless access nodes associated with the selected at least one of the received RARs.

23. The computer readable apparatus of claim 17, wherein the receipt of the configuration data enables multi-access node mapping for one or more access opportunities.

24. The computer readable apparatus of claim 17, wherein the monitoring of the single BWP comprises performing physical downlink control channel (PDCCH) detection on the non-overlapping search spaces using a same random access radio network temporary identifier (RA-RNTI) to detect respective downlink control information (DCI), each scheduling a respective RAR from a different one of the plurality of wireless access nodes.

* * * * *